United States Patent [19]
Smith et al.

[11] Patent Number: 5,410,467
[45] Date of Patent: Apr. 25, 1995

[54] POWER CONVERTERS WITH IMPROVED SWITCHING EFFICIENCY

[75] Inventors: David A. Smith, Kowloon; Neal G. Stewart, Sai Kung, both of Hong Kong

[73] Assignee: Astec International Limited, Hong Kong

[21] Appl. No.: 28,836

[22] Filed: Mar. 10, 1993

[30] Foreign Application Priority Data

Mar. 19, 1992 [GB] United Kingdom ............... 9206020

[51] Int. Cl.$^6$ ........................................... H02M 7/537
[52] U.S. Cl. ...................................... 363/131; 363/16; 363/20; 363/24
[58] Field of Search .................. 363/16, 22, 24, 50, 363/55, 56, 20, 21, 133, 134, 131, 25, 26; 323/222, 259, 344

[56] References Cited

U.S. PATENT DOCUMENTS

| | | | |
|---|---|---|---|
| 3,151,287 | 9/1964 | Pintell | 363/22 |
| 5,162,981 | 11/1992 | Lazar et al. | 363/22 |
| 5,173,846 | 12/1992 | Smith | 363/20 |
| 5,173,847 | 12/1992 | Suzuki | 363/21 |
| 5,218,522 | 6/1993 | Phelps et al. | 363/124 |
| 5,289,101 | 2/1994 | Furuta et al. | 320/21 |

OTHER PUBLICATIONS

Hua, et al., "Novel Zero-Voltage-Transition PWM Converters", *Proceedings of the 23rd Annual Power Electronics Specialists Conference*, IEEE, Jun. 29–Jul. 3, 1992, pp. 55–61.

*Primary Examiner*—Steven L. Stephan
*Assistant Examiner*—Adolf Berhane
*Attorney, Agent, or Firm*—McCubbrey, Bartels & Ward

[57] ABSTRACT

A Circuit for reversing the direction of current flow in a rectifying device of a power converter during a time interval just prior to when the rectifying device is to be rendered non-conductive is described. The current reversal substantially reduces or eliminates reverse-recovery currents in the rectifying device, which may cause short circuits and needlessly dissipates power. The circuit comprises an energy source, a magnetic storage device, and a switch for coupling the magnetic storage device to the energy source. The magnetic storage device may comprise an inductor or a transformer. The energy source may include a voltage source, the converter's input voltage, the output voltage, or a winding magnetically coupled to another magnetic storage device of the converter. The reversal circuit includes a circuit for coupling the reversing current to the rectifying device such that it partially or completely reverses the flow of current in the rectifying device.

27 Claims, 15 Drawing Sheets

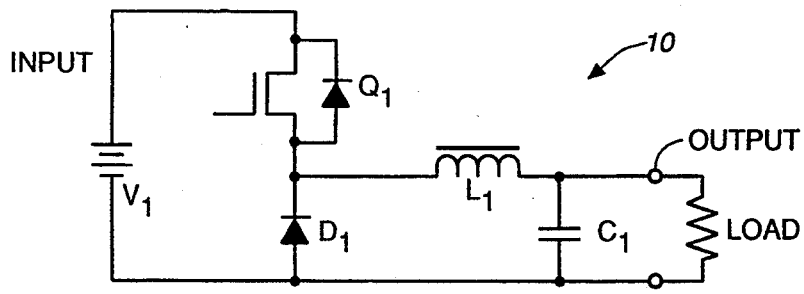
FIG._1
(PRIOR ART)
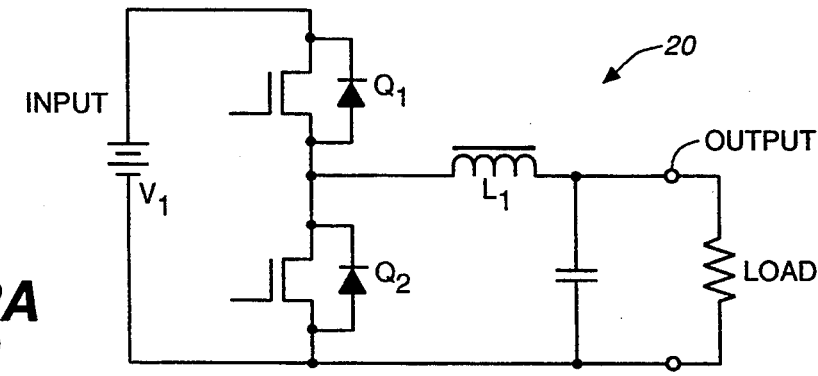
FIG._2A
(PRIOR ART)
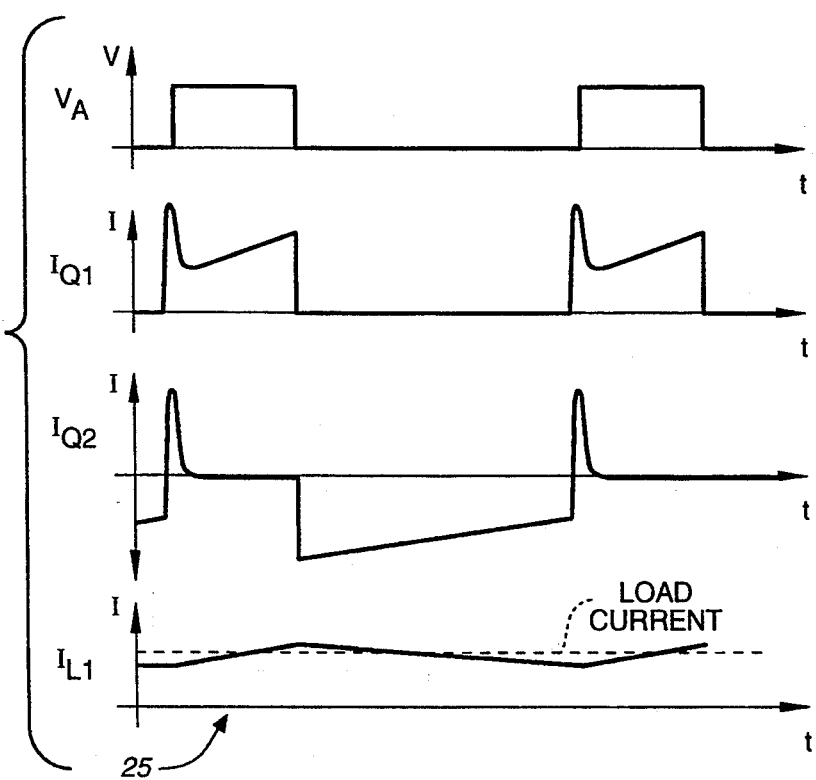
FIG._2B

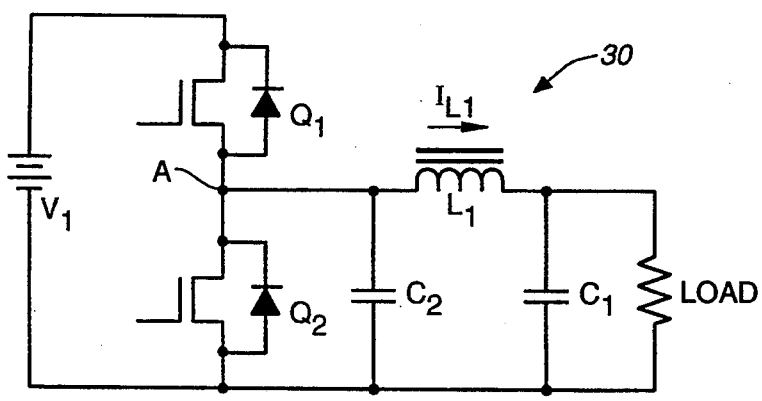
FIG._3A
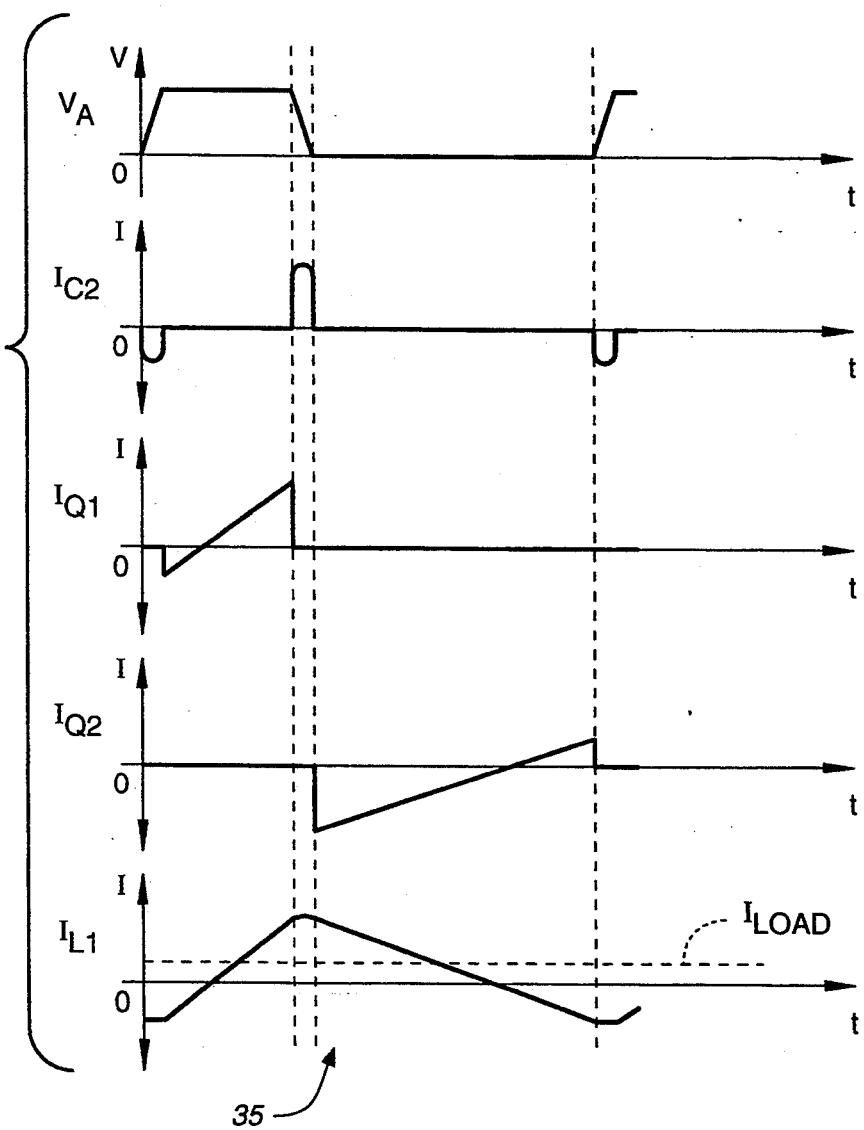
FIG._3B

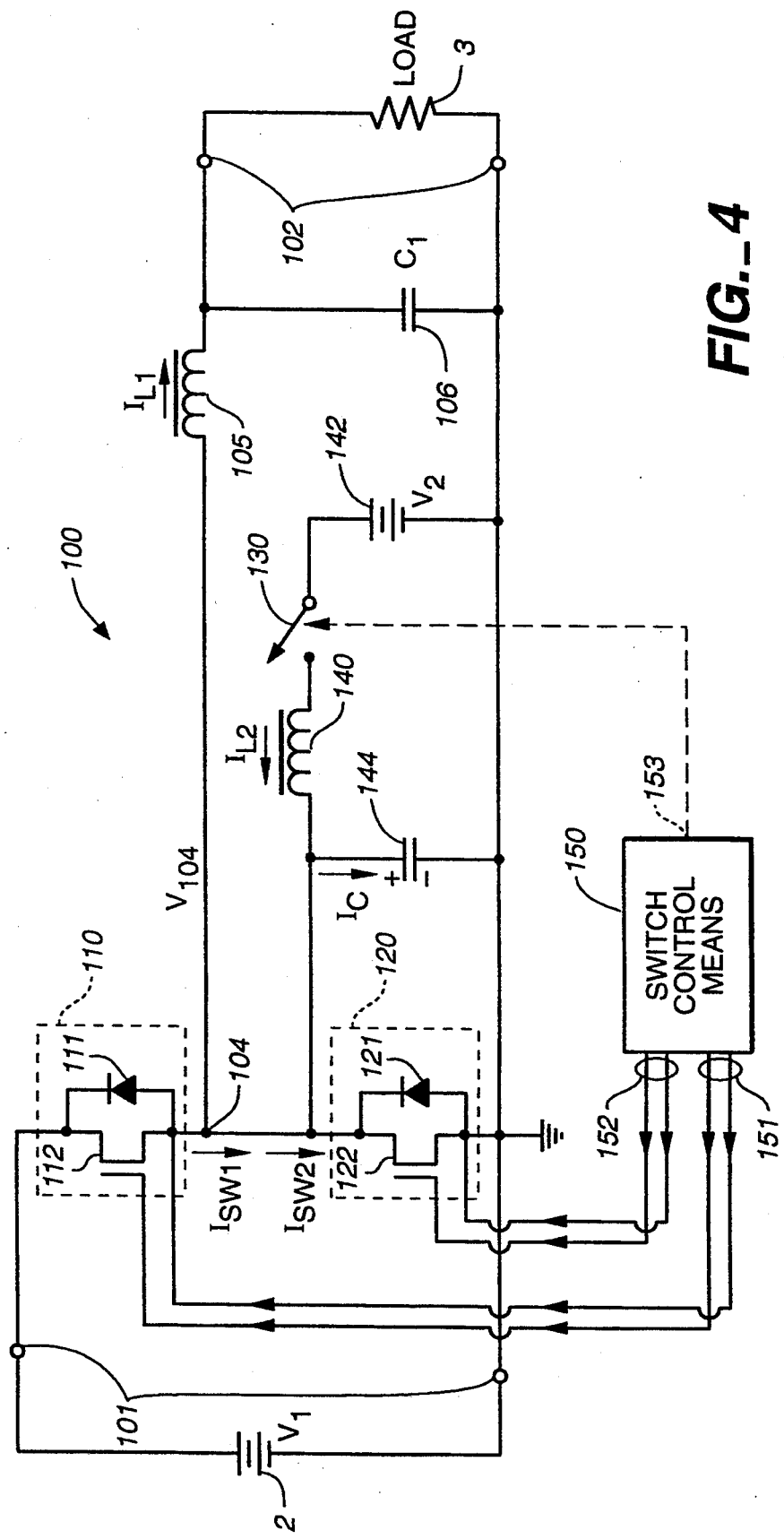
FIG._4

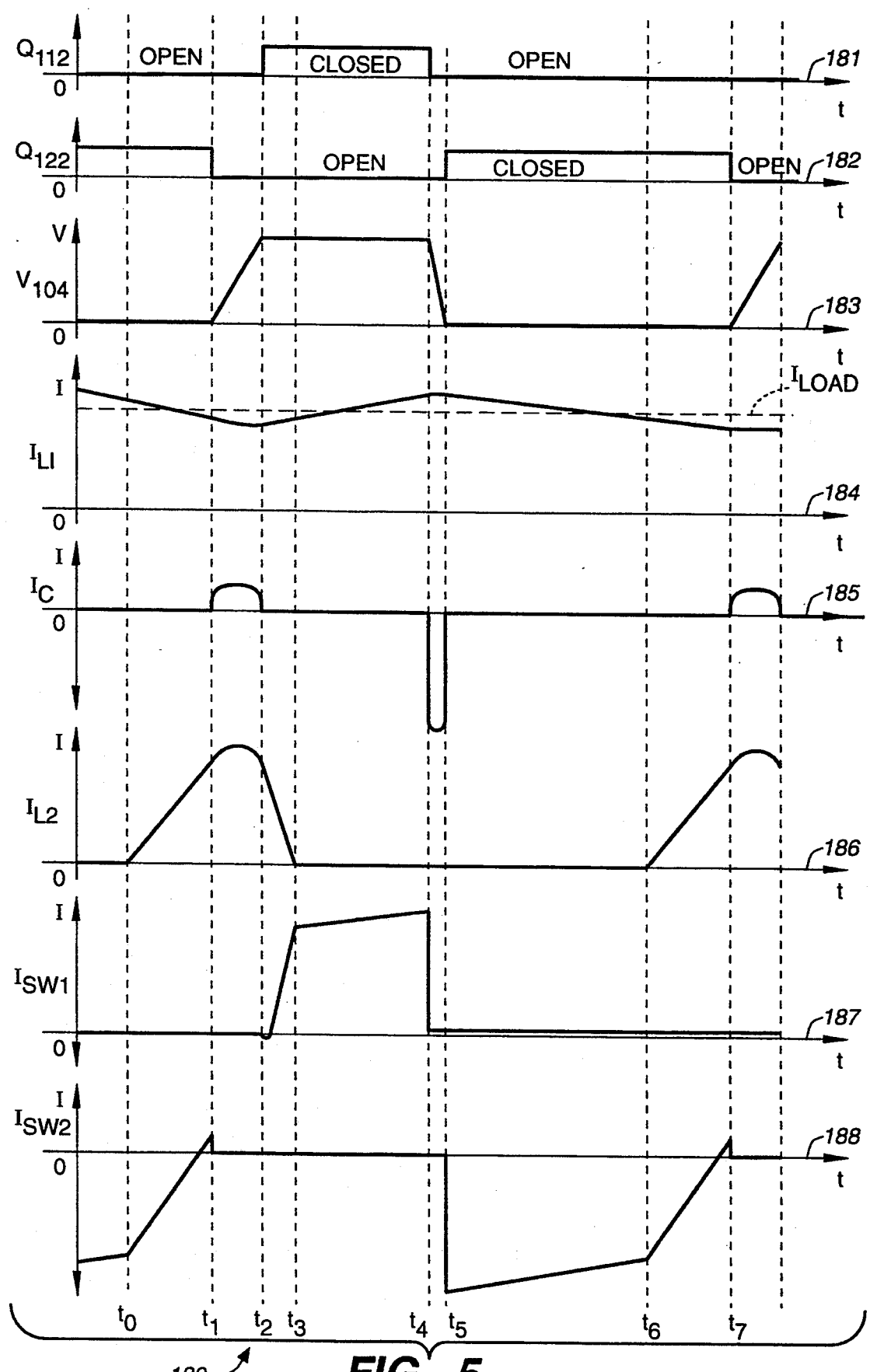
FIG._5

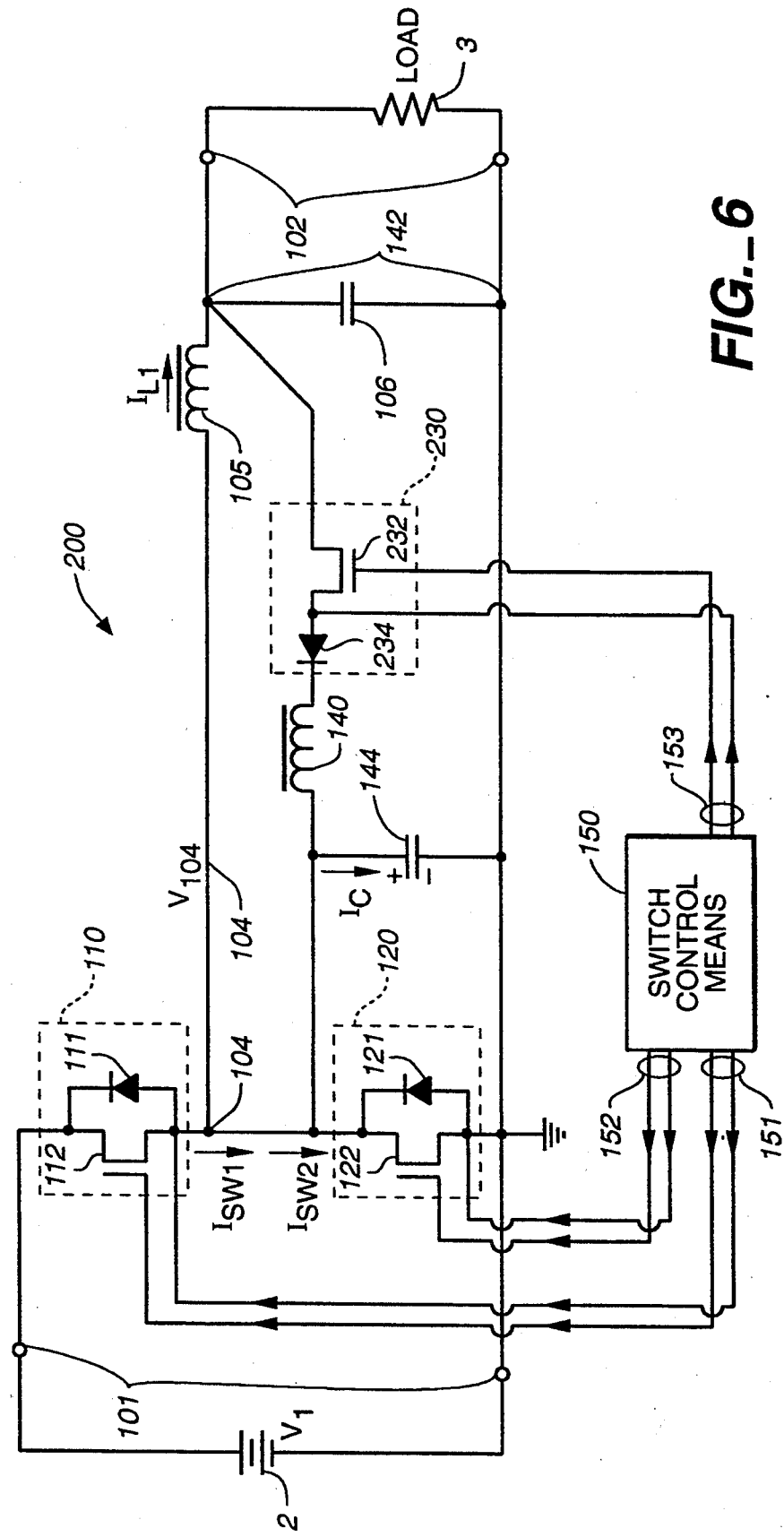
FIG._6

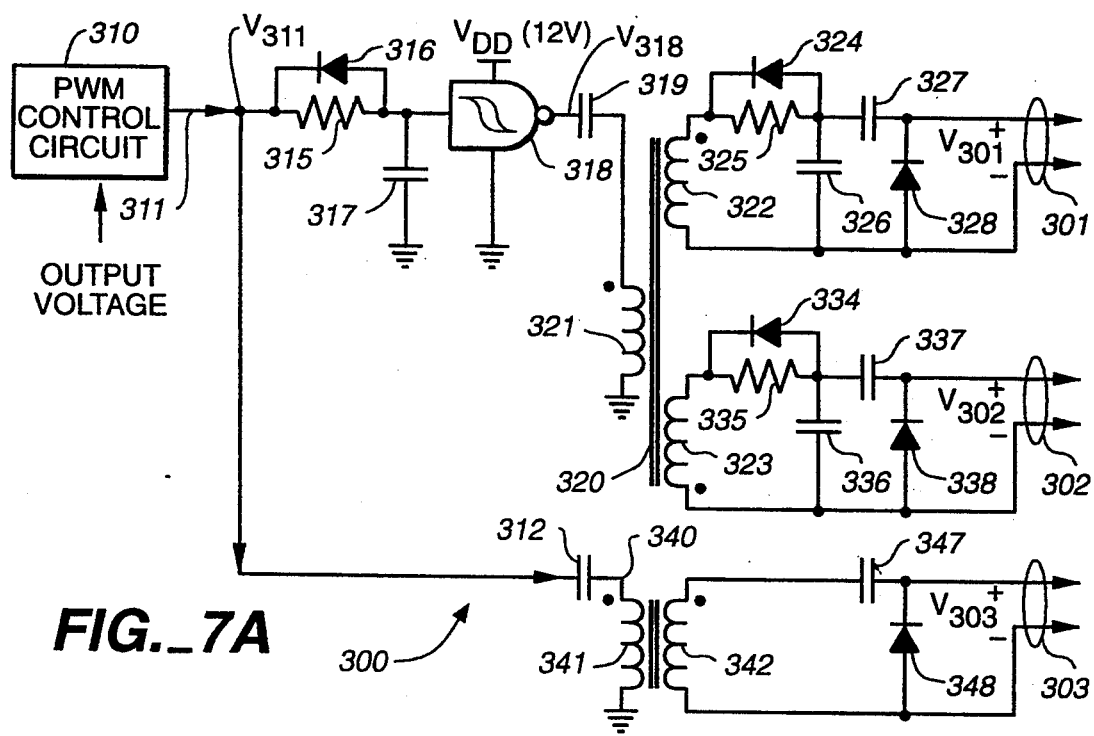
FIG._7A
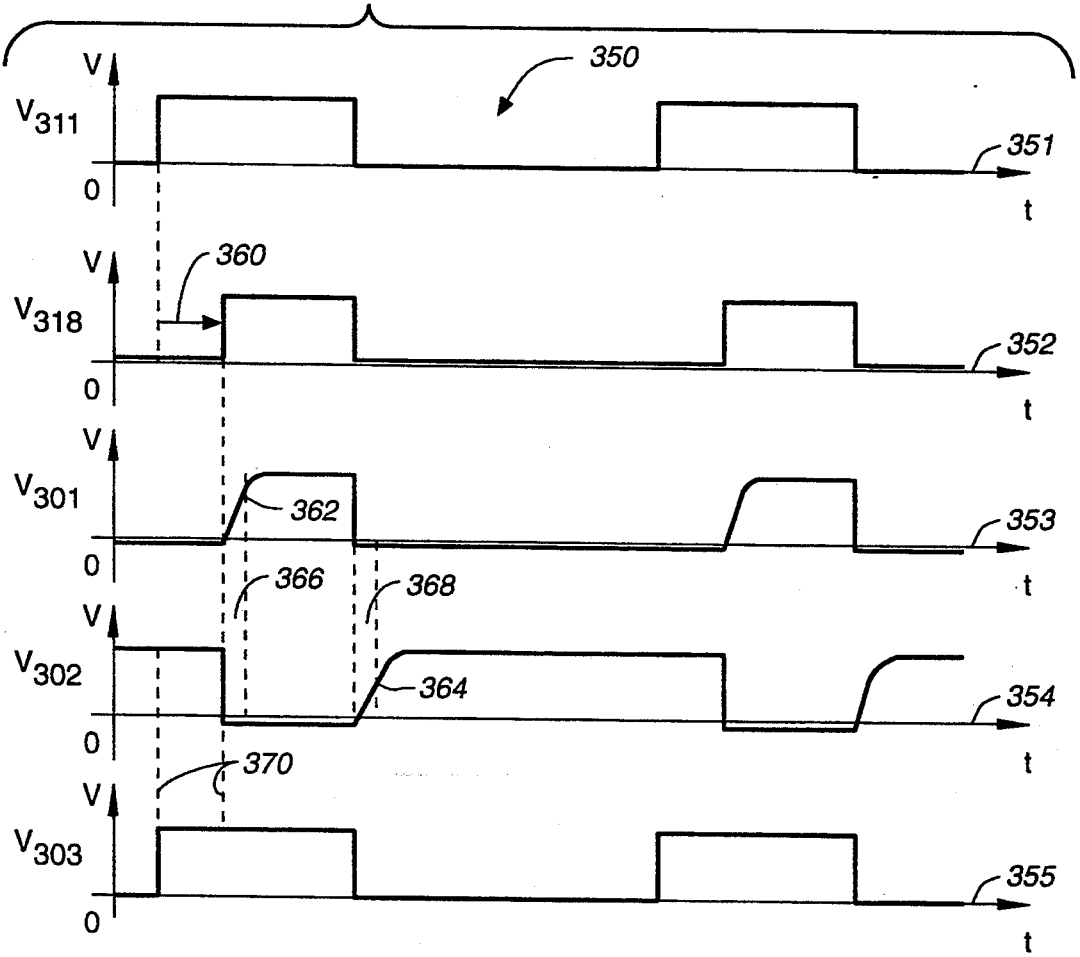
FIG._7B

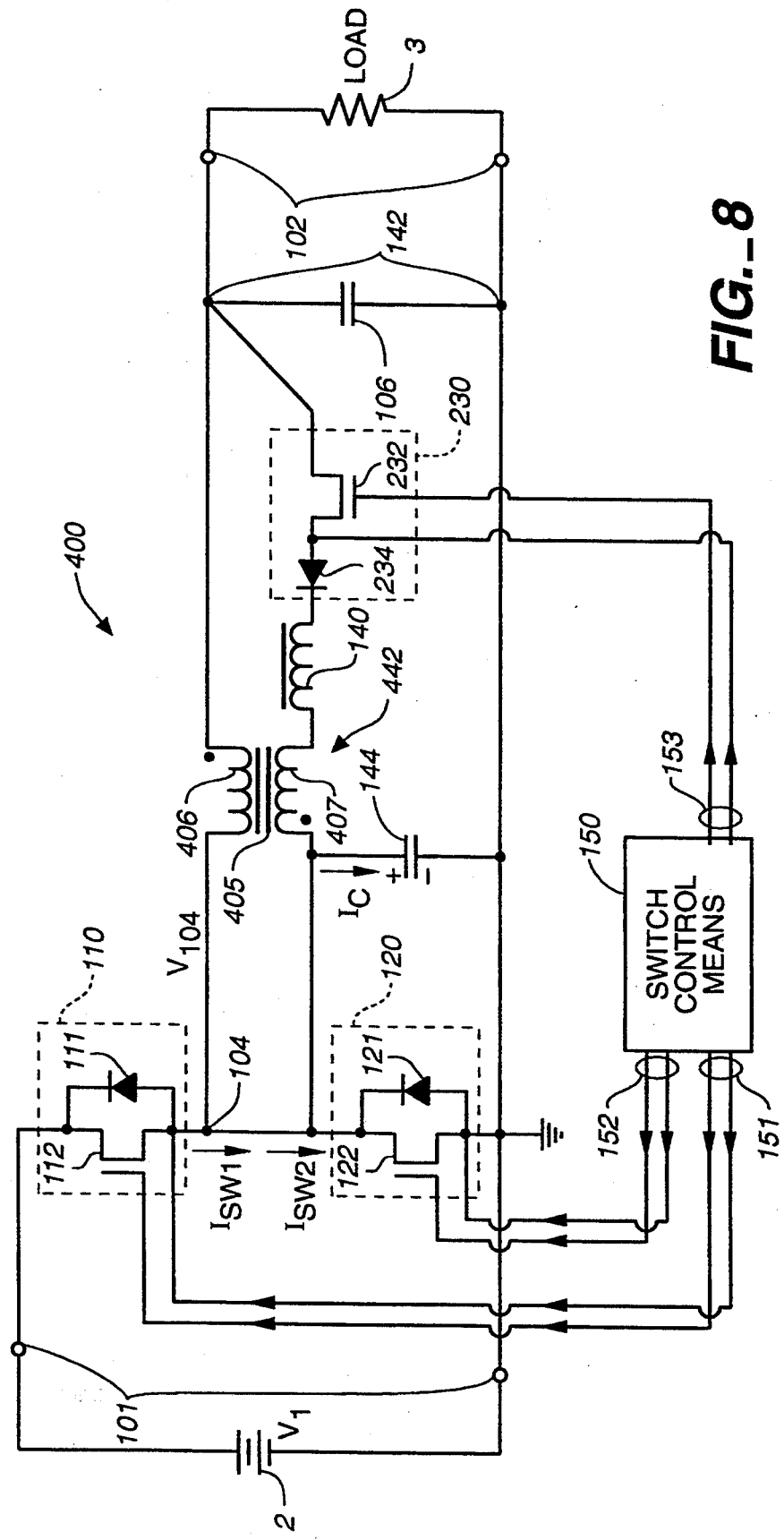
FIG._8

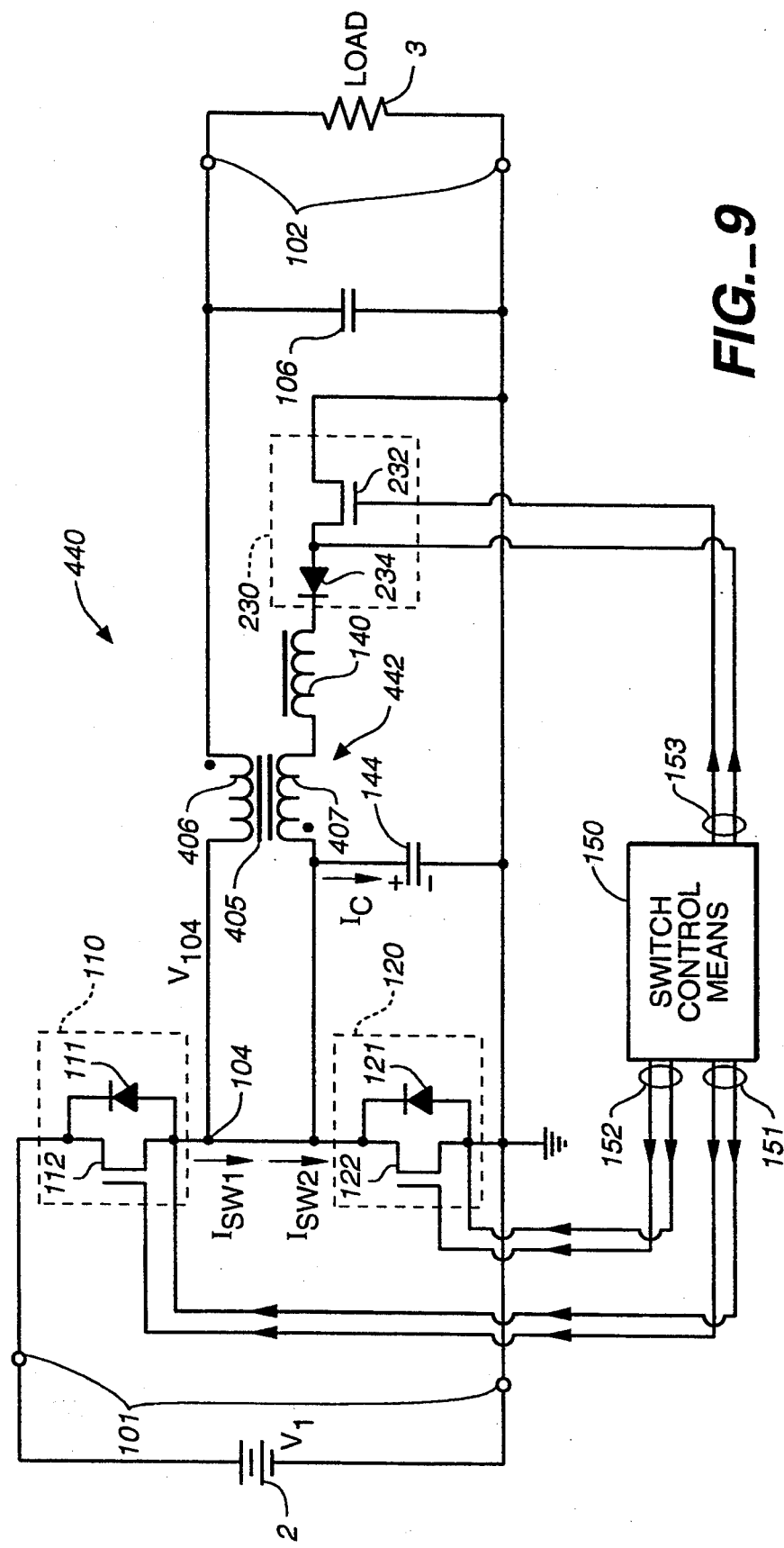
FIG._9

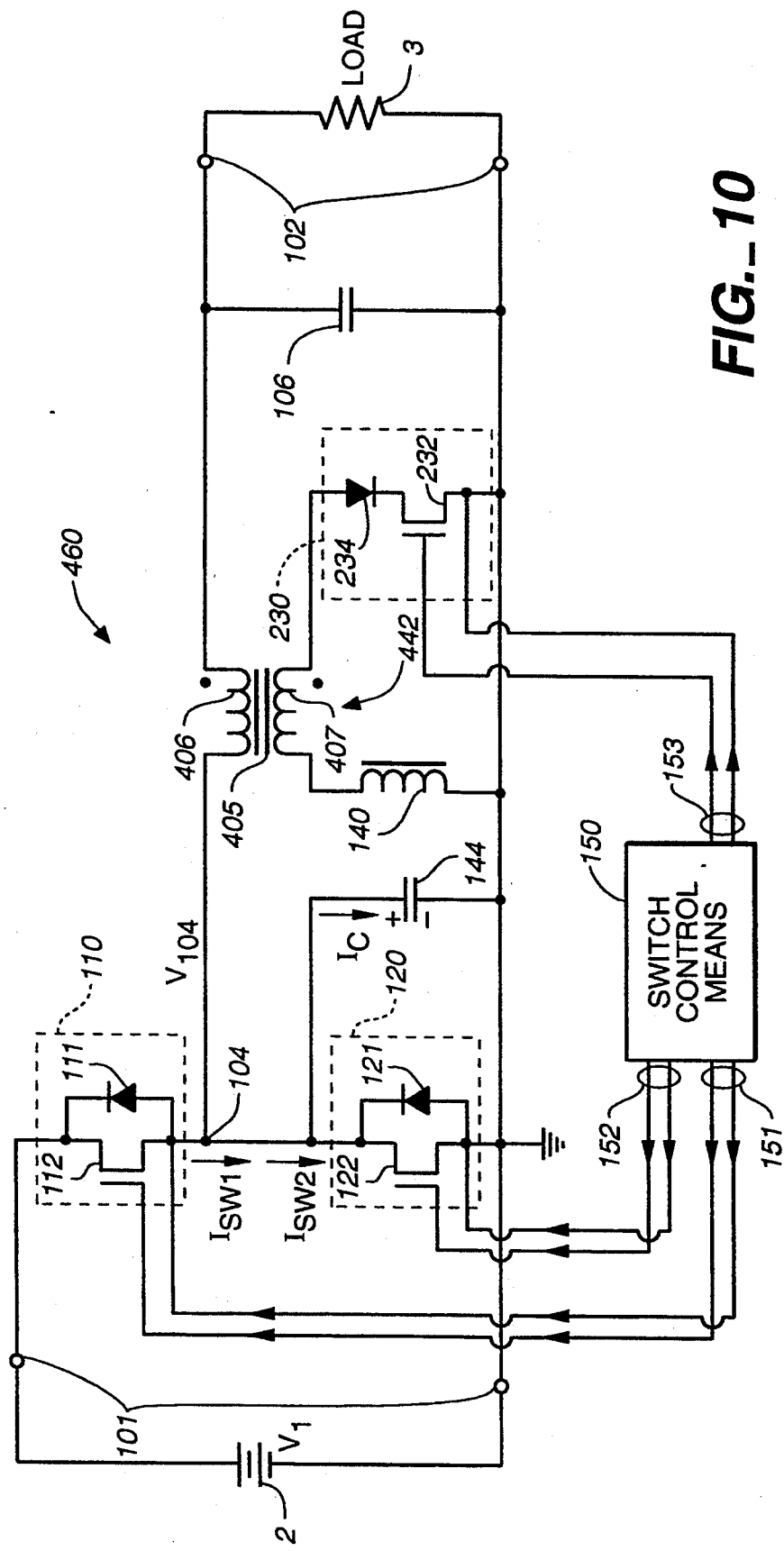
FIG._10

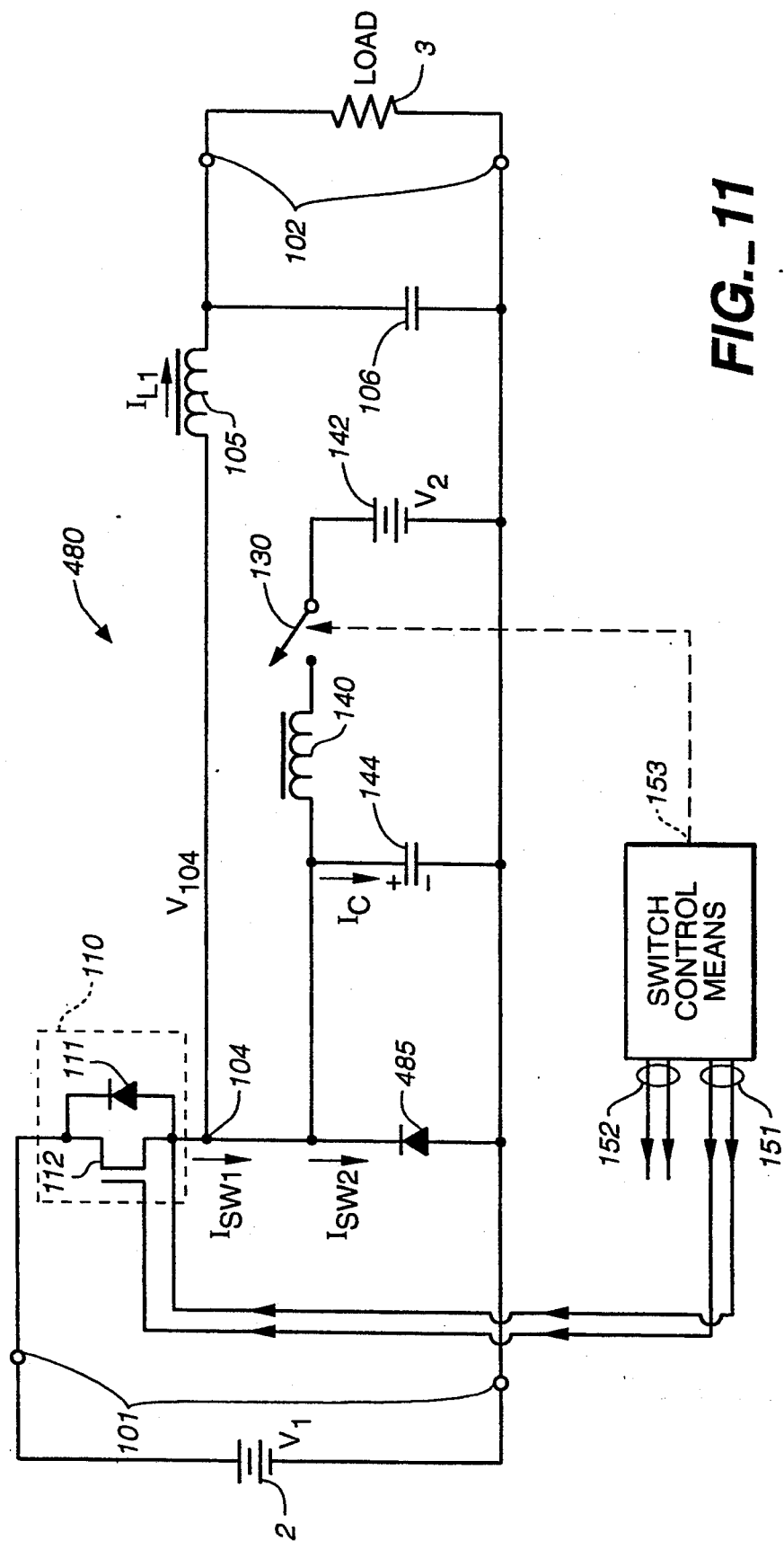
FIG._11

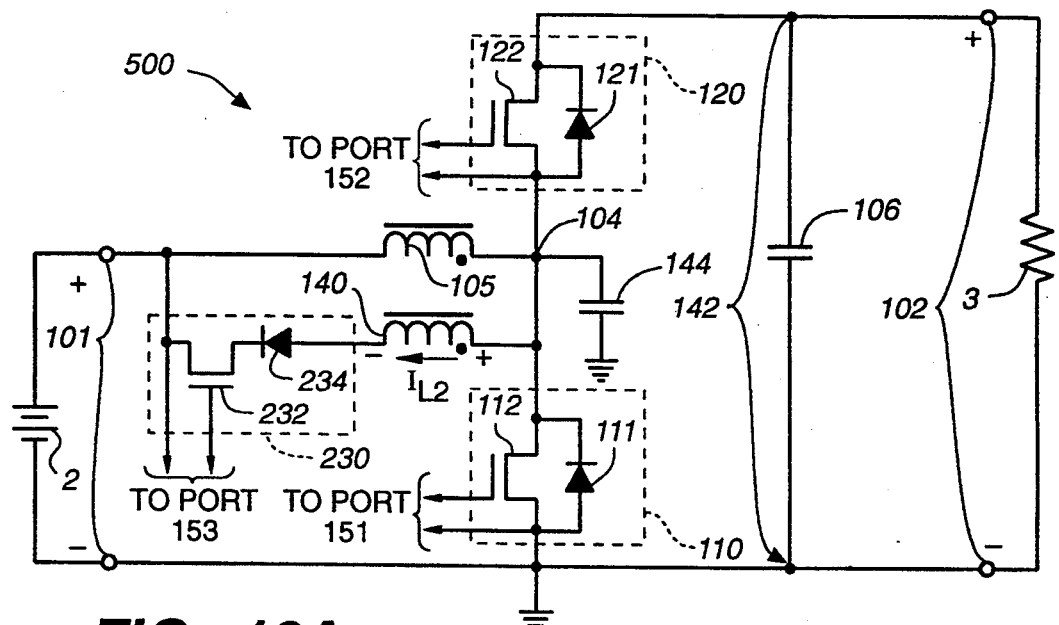
FIG._12A
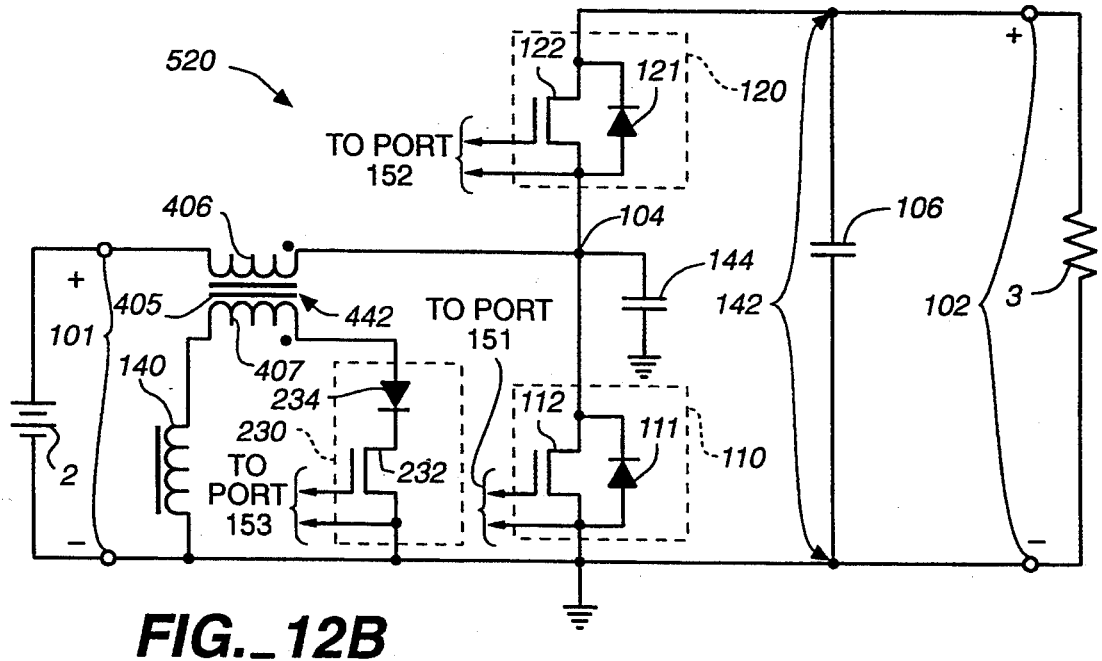
FIG._12B

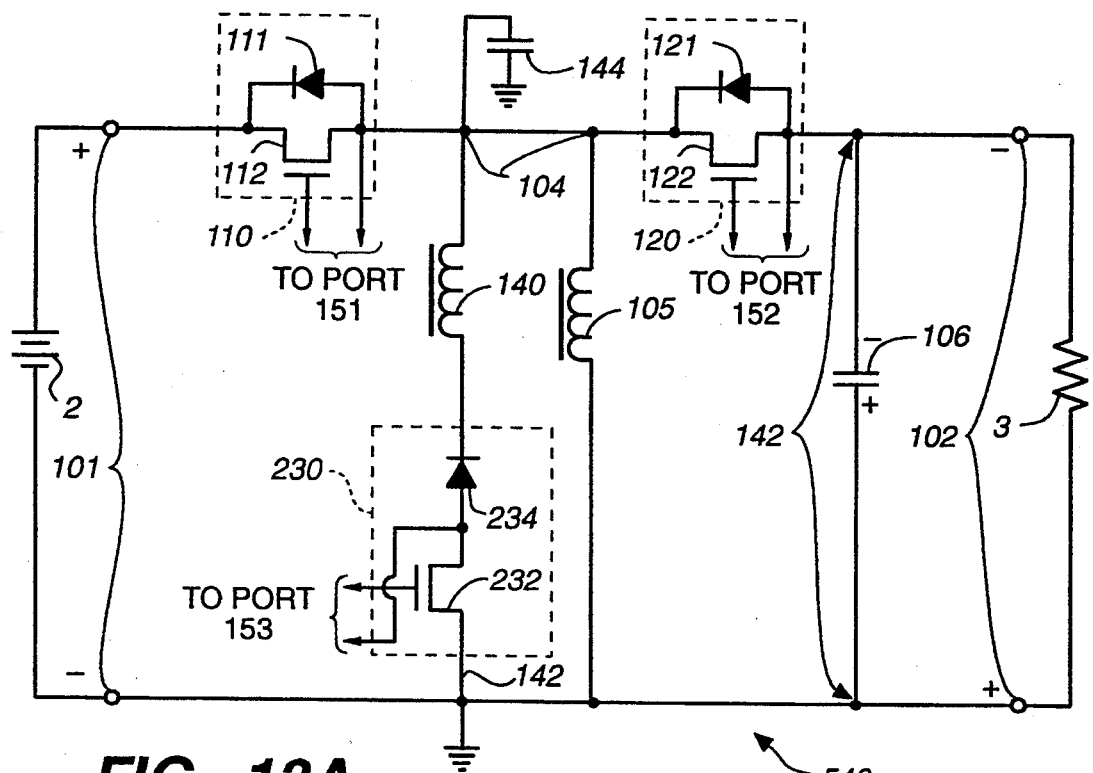
FIG._13A
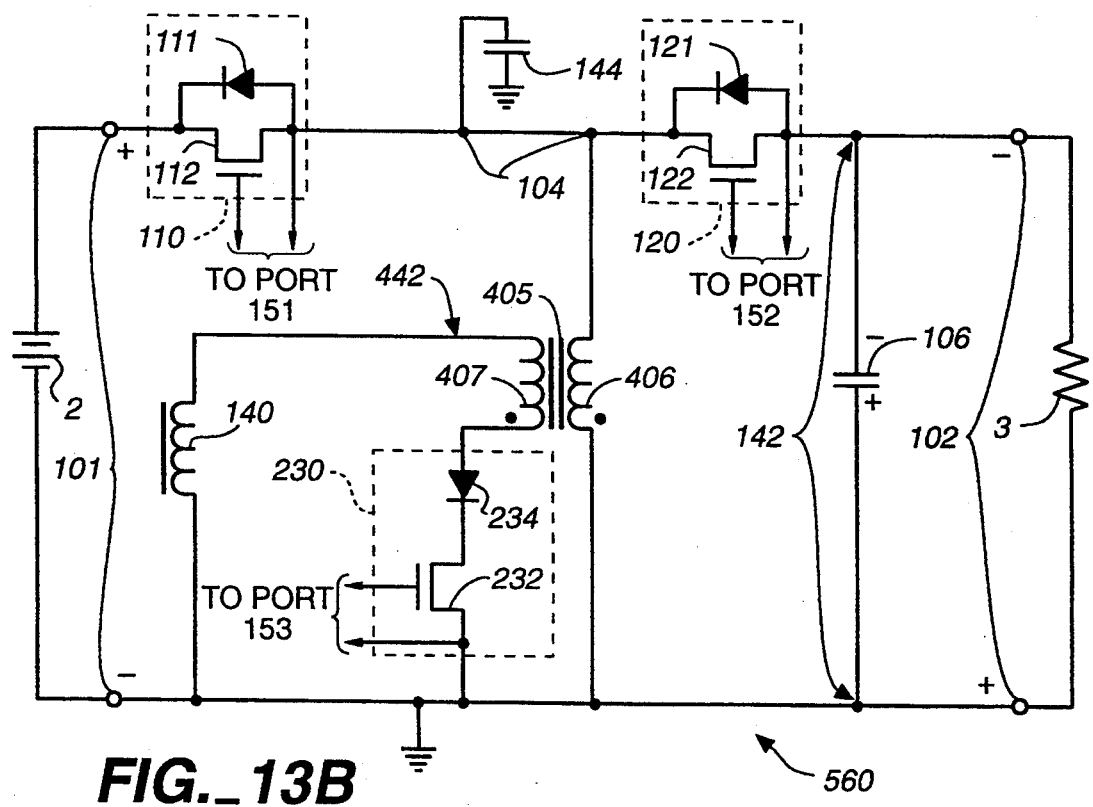
FIG._13B

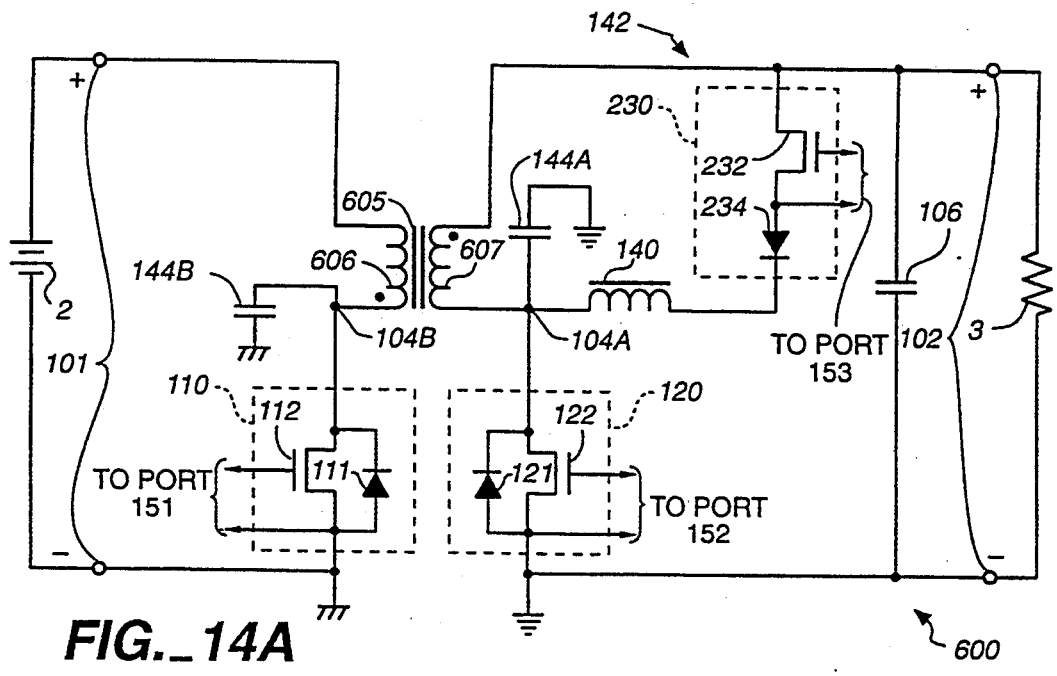
FIG._14A
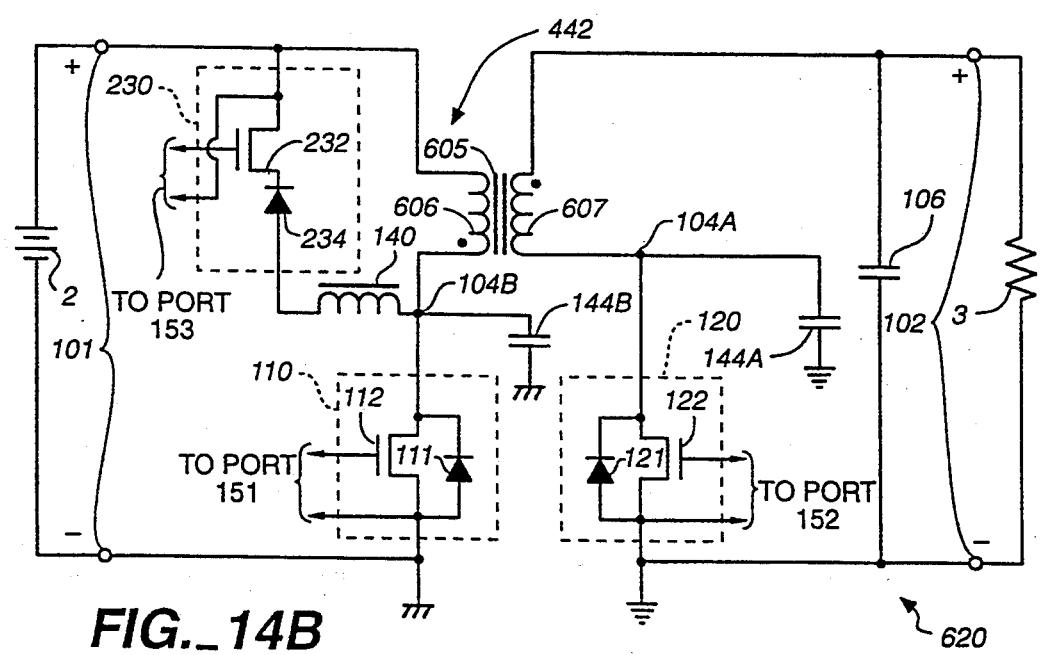
FIG._14B

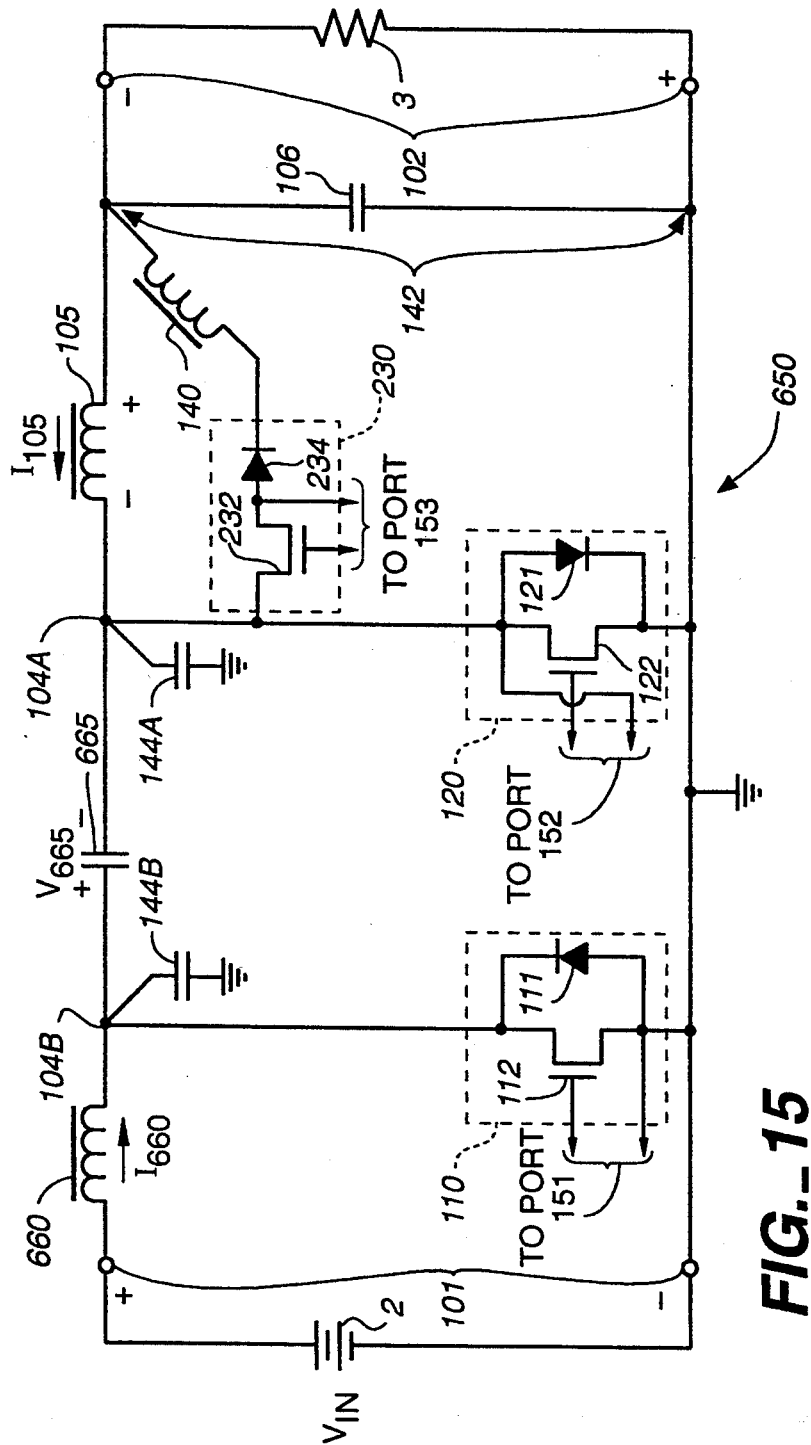
FIG._15

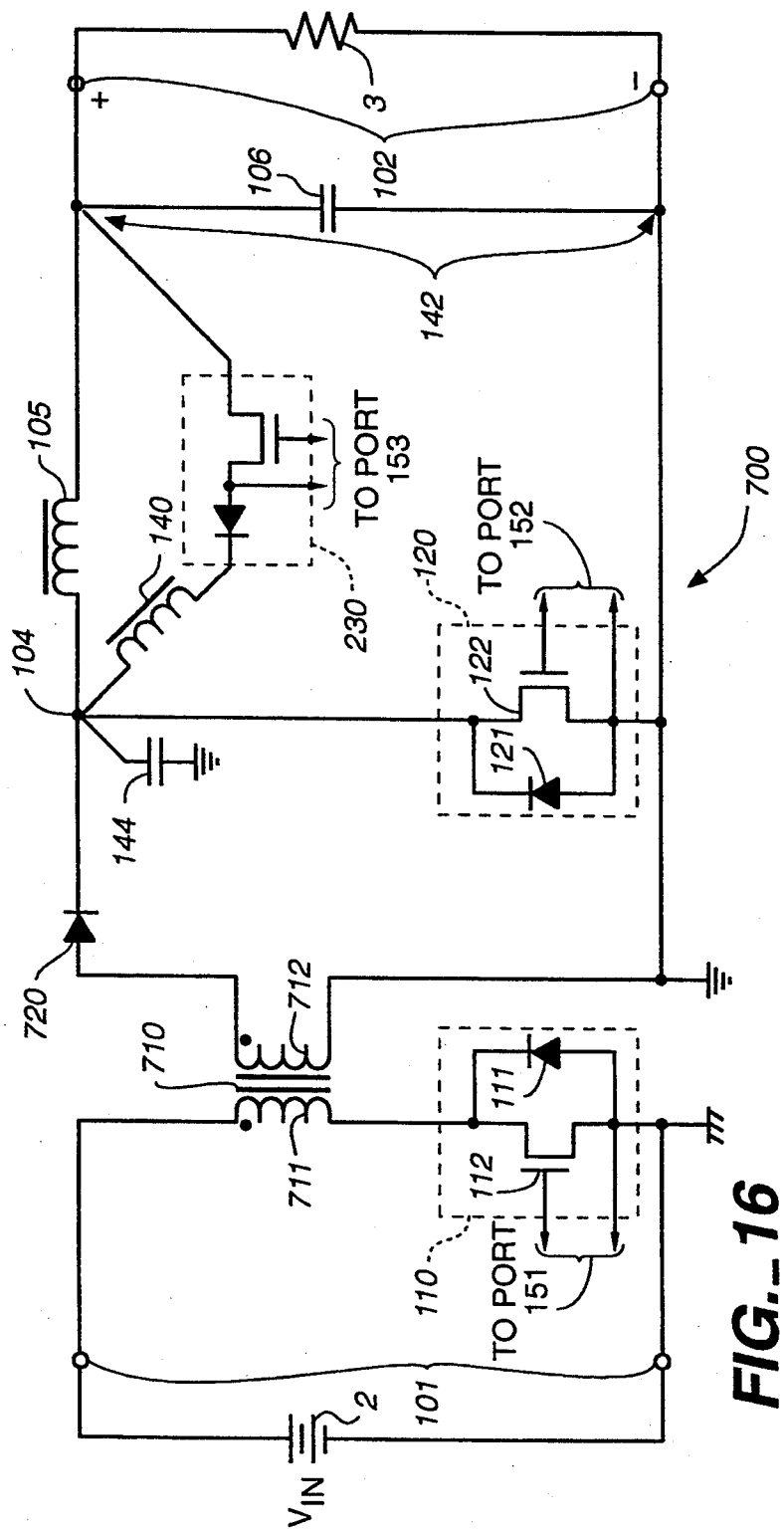
FIG._16

POWER CONVERTERS WITH IMPROVED SWITCHING EFFICIENCY

FIELD OF THE INVENTION

The present invention relates to electrical power converters and, more particularly, to switching power converters and transfer circuits having a primary switch for coupling power to a magnetic storage element and a synchronous rectifying device for coupling energy stored in the magnetic element to a load. In the field of power converters, the present invention is applicable to, but not limited to, buck converters, boost converters, buck-boost converters, and flyback converters, ( uk converters, and the secondary circuits of forward converters.

BACKGROUND OF THE INVENTION

There are several types of power converters which comprise a magnetic storage element, such as a transformer or inductor, a primary switch for coupling power to the magnetic element from an input source, and a rectifying device for coupling power from the storage element to a load when the primary switch is not coupling power thereto. (As is known in the art, the term "power" is the rate at which energy is supplied, coupled, delivered, or utilized. It is often used interchangeably with the term "energy" when describing the general function of power and/or energy converters, and when describing the general function of input energy/power sources. Only the term "power" will therefore be used hereinbelow.) Examples of such converters are: buck converters, boost converters, buck-boost converters, and flyback converters. In operation, the primary switch means is switched in cycles of alternating ON-periods and OFF-periods, coupling power to the storage element during each ON-period. The rectifying device is generally configured to detect the start of each OFF-period, as for example by detecting a reverse voltage generated across the magnetic element and/or itself, and for conducting current built up in the storage element to the load. The rectifying device generally conducts this current until it is interrupted by the primary switch turning on, again reversing the voltages across the magnetic storage element and rectifying device.

As is known in the semiconductor art, many rectifying devices are prone to generating a reverse-recovery current when their voltages are reversed from a positive value (forward conducting, ~0.6 V) to a negative value (reverse biased). The direction of the reverse-recovery current is opposite to that of the forward conduction current and is much larger in magnitude than the reverse leakage current of the rectifying device. The reverse-recovery current is due to the charge stored in the rectifying device (e.g., in the semiconductor material) which is needed to support the forward current and continues until the stored charge is removed from the rectifying device. The magnitude of the reverse-recovery current is generally set by conditions of the circuit coupled to the rectifying device. In general, the stored charge in uni-polar devices, such as schottky diodes, is removed more quickly than the stored charge in bipolar devices, such as pn-diodes, and are thus preferred.

The primary switch means and rectifying device of the above-noted converters are typically configured such that a short circuit across either the input power supply or output load develops when a reverse-recovery current is generated in the rectifying device. This, of course, causes power dissipation in the converter and reduces the efficiency of the converter. For this reason, uni-polar rectifying devices are often used to minimize the amount of reverse-recovery current and, hence, the amount of power dissipation.

However, there has been a recent trend in the power conversion arts to replace these rectifying devices with "synchronous rectifiers" to reduce the voltage drop across the rectifying devices, and to thereby reduce the power dissipation. Such a synchronous rectifier generally comprises a transistor device coupled in parallel with a rectifying device. The rectifying device conducts as before, but the transistor device is turned on when the rectifying device is conducting, reducing the voltage drop from ~0.5 V to ~0.15 V. The rectifying device is generally integrated with the transistor device as a "body diode" on a single semiconductor chip, and is usually formed by a pn-junction, which is capable of generating a large reverse-recovery current. Unfortunately, the power dissipated by a short circuit in the above-noted converters is often comparable to the power dissipation saved by the lower voltage drop.

The reverse-recovery current and its effects may be more fully appreciated by the following exemplary discussion of the standard buck converter, synchronous rectifying buck converter, and transition resonant buck converter.

A standard buck converter is shown at 10 in FIG. 1. Converter 10 converts input power from an unregulated voltage supply to an output having a regulated voltage which is lower than the input voltage. In operation, transistor $Q_1$ is periodically switched. When closed, $Q_1$ charges inductor $L_1$ and couples power to the load. When open, $Q_1$ causes inductor $L_1$ to discharge through diode $D_1$. The output voltage is regulated by varying the time $Q_1$ is closed during the switching cycle. If the output voltage of the buck converter is set to a low value, such as 3.3 V to 5.0 V, the efficiency of the converter will be poor due to the relatively large forward voltage drop (0.5 V) across rectifier $D_1$.

To improve the converter's efficiency, rectifier $D_1$ may be replaced with a synchronous rectifier switch, which has a forward voltage drop on the order of 0.1 V to 0.2 V. An exemplary synchronous rectifier buck converter is shown at 20 in FIG. 2A. Converter 20 comprises two switching transistors $Q_1$ and $Q_2$, each preferably comprising a MOSFET transistor for faster switching and hence low switching losses. In operation, transistors $Q_1$ and $Q_2$ are alternately switched such that transistors $Q_1$ and $Q_2$ are not switched ON at the same time. If $Q_1$ and $Q_2$ were on at the same time, a short circuit would be coupled across the input supply, resulting in possible damage to the supply and/or transistors $Q_1$ and $Q_2$. As such, $Q_2$ is turned off just before $Q_1$ is turned on, and vice-versa. During the short time intervals when both transistors $Q_1$ and $Q_2$ are in an OFF state, the current $I_{L1}$ through inductor $L_1$ completes its path through the body diode of transistor $Q_2$.

Unfortunately, the body diode of transistor $Q_2$ is not an ultra-fast recovery rectifier, mainly because it is a parasitic component of the switching transistor and is not optimized for fast recovery. With a slow recovery time, the body diode of $Q_2$ will conduct a significant current in the reverse direction for an amount of time after the diode voltage reverses from positive to negative. This reverse recovery current is substantially larger than the steady-state reverse leakage current and is mainly determined by the voltage and resistance of the external circuit. The reverse current continues until the minority carriers in the diode material (i.e., semiconductor) have recombined with majority carriers. Accordingly, after $Q_1$ turns on, the body diode $Q_2$ conducts current during the recovery time and forms a transient short circuit across the input with transistor $Q_1$. This increases the power dissipation in converter 20. The currents in transistors $Q_1$ and $Q_2$ and the current in inductor $L_1$ are shown in a timing diagram 25 in FIG. 2B. Also shown in FIG. 2B is the voltage at a node A, which couples transistors $Q_1$ and $Q_2$. The current through the body diode has been included into the current for transistor $Q_2$ and its effects are shown by the large current spikes.

The transition resonant buck converter shown at 30 in FIG. 3A is one prior art approach for addressing the reverse recovery problem of converter 20. In converter 30, transistors $Q_1$ and $Q_2$ are retained, but the inductance of inductor $L_1$ is substantially reduced and a resonant capacitor $C_2$ is coupled across transistor $Q_2$. The inductance of $L_1$ is chosen to give a peak-to-peak inductor ripple current of more than twice the maximum load current, as opposed to 10%-20% for converters 10 and 20. The currents in capacitor $C_2$, transistors $Q_1$ and $Q_2$, and inductor $L_1$ are shown in a timing diagram 35 in FIG. 3B. Also shown in FIG. 3B is the voltage at a node A, which couples transistors $Q_1$ and $Q_2$. In the operation of converter 30, the direction of current flow in inductor $L_1$ alternates between flowing to capacitor $C_1$ and the load (positive ampere value) and flowing towards resonant capacitor $C_2$ and transistors $Q_1$ and $Q_2$ (negative ampere value) because of the small inductance of $L_1$. Transistors $Q_1$ and $Q_2$ switch in an alternating fashion as in converter 20, with neither switch being on at the same time. During the ON period of each transistor of converter 30, the direction of current flow in inductor $L_1$ reverses.

More specifically, during the ON-period of $Q_1$, the current flow through $Q_1$ ramps from a negative value to a positive value. The body diode of $Q_1$ may conduct the initial portion of the negative current. Once becoming fully conductive, the MOSFET device of $Q_1$ effectively short circuits $Q_1$'s body diode and, with positive current flow in the latter portion of $Q_1$'s ON period, eliminates the possibility of the diode generating a reverse-recovery current. When $Q_1$ is turned off, inductor $L_1$ draws current from resonant capacitor $C_2$, discharging capacitor C: and reducing the voltage at node A. At zero volts at node A, the body diode of $Q_2$ conducts and the MOSFET device of $Q_2$ is subsequently turned on. During $Q_2$'s ON-period, the current flow through Q: ramps from a negative value to a positive value. Once becoming fully conductive, the MOSFET device of $Q_2$ effectively short circuits $Q_2$'s body diode and, with positive current flow in the latter portion of $Q_2$'s ON period, eliminates the possibility of the diode generating a reverse-recovery current. When $Q_2$ is turned off, inductor $L_1$ couples current to capacitor $C_2$, charging capacitor $C_2$ and raising the voltage at node A. When the voltage at node A becomes greater than the input voltage, the body diode of $Q_1$ conducts and the MOSFET device of $Q_1$ is subsequently turned on for another switching cycle.

In this way, converter 30 eliminates the transient short circuits across the input supply and thereby reduces switching losses. Converter 30 also reduces switching losses by causing each of transistors $Q_1$ and $Q_2$ to close when a substantially zero-voltage condition exists. Additionally, converter 30 reduces electromagnetic interference (EMI). As is known in the art, EMI is generated by rapid changes in current around a loop, as for example caused by current spikes, and by rapid changes in node voltages. Both sources of interference are present in standard buck converter 10 and synchronous converter 20 due to the switching of transistors $Q_1$ and $Q_2$. Converter 30 has much lower EMI due to the elimination of current spikes and because resonant capacitor $C_2$ slows down the rate of change in voltage across the transistors and the rate of change in current around circuit loops.

However, transient resonant buck converter 30 has a number of significant disadvantages associated with the large ripple current in inductor $L_1$ necessary for converter 30 to function properly. This ripple current is approximately five to ten times larger than the ripple currents of converters 10 and 20. As a first disadvantage, the AC component of inductor $L_1$'s current flows into output capacitor $C_1$ and the DC component flows into the load. Output capacitor $C_1$ must be five to ten times larger than that required for converters 10 and 20 to have the same amount of output ripple voltage, and must be a high-quality type to carry the large ripple current without self-heating. The large capacitor value and high quality requirements mean that capacitor $C_1$ is physically larger and more expensive than the output capacitor for converters 10 and 20. Also, the larger AC ripple current causes the RMS and peak currents in transistors $Q_1$ and $Q_2$ to be larger than the corresponding currents in converters 10 and 20. This increases conduction losses in these transistors, which partly offsets the reduction realized by eliminating the recovery current. Additionally, because of the large AC ripple current, the power conversion efficiency of converter 30 at low load-current levels is poor.

As such, the above-described prior art approaches for minimizing the power and energy dissipation caused by reverse-recovery currents have created other power dissipation factors and higher costs. There is therefore a need in the power conversion art for a means of efficiently reducing the power dissipation losses due to reverse-recovery currents generated by rectifying devices and synchronous rectifying devices.

SUMMARY OF THE INVENTION

The present invention may be applied to any power converter or energy transfer circuit which has an input port for receiving an input source of energy, a first magnetic storage means, a means for periodically coupling energy present at the input port to the first magnetic storage means in a plurality of consecutive switching cycles, and a rectifying device coupled to the first magnetic storage element to an output port. The first magnetic storage element may include an inductor, a transformer, or other suitable magnetic storage means. Each switching cycle includes an ON period wherein energy is coupled to the magnetic storage means from the input port and an OFF period wherein energy is not coupled to the first magnetic storage means. The rectifying device enables energy to be coupled from the first magnetic storage means to the output port during the OFF periods. The rectifying device may include such components as a rectifier, a synchronous rectifier, a switch means, a transistor device, or other suitable semiconductor devices.

Broadly stated, the present invention comprises circuitry for reversing the direction of current flow in the rectifying device during a time interval just prior to the end of each OFF period such that reverse-recovery currents in the rectifying device are reduced or substantially prevented. The circuitry comprises an energy source, a second magnetic storage means, and a switch means for coupling the second magnetic storage means to the energy source. The second magnetic storage means may include an inductor or other suitable magnetic storage means, or may be formed as part of the first magnetic storage means. The energy source may include a voltage source, the energy provided to a load, or a winding magnetically coupled to the first magnetic storage means. During each OFF period, the switch means closes in a time interval prior to the end of the OFF period and causes a reversing current to be generated in the second magnetic storage means. The reversal circuitry further comprises means for coupling the reversing current to the rectifying device such that it partially or completely reverses the flow of current in the rectifying device, thereby reducing or eliminating reverse recovery currents in the rectifying device.

In the preferred embodiments of the present invention, the second magnetic storage means and reversal Switch means are configured to couple the energy built up in the second magnetic storage means to either the input energy source or the output load so that the energy is not wasted. Thus, the present invention may operate with minimal power dissipation since this energy is recycled and since the reverse recovery currents are reduced or eliminated. The present invention may be applied to a number of known converter topologies, such as buck, boost, buck-boost, flyback, (uk, forward, and variations thereof.

Accordingly, is an object of the present invention to provide a rectifying device for use in a plurality of power converter and energy transfer applications which has substantially reduced recovery currents or substantially no reverse-recovery currents.

It is another object of the present invention to significantly reduce the power dissipation in the switching devices of a plurality of power converters and power transfer circuits.

These and other objects of the present invention will become apparent to those skilled in the art from the following detailed description of the invention, the accompanying drawings, and the appended claims.

BRIEF DESCRIPTION OF THE DRAWINGS

FIG. 1 is a schematic diagram of a conventional buck power converter according to the prior art.

FIG. 2A is a schematic diagram of a buck converter having a synchronous rectifier according to the prior art.

FIG. 2B is a timing diagram of key voltages and currents of the converter shown in FIG. 2A.

FIG. 3A is a schematic diagram of a transition resonant buck converter according to the prior art.

FIG. 3B is a timing diagram of key voltages and currents of the converter shown in FIG. 3A.

FIG. 4 is a schematic diagram of a first embodiment of the present invention configured in a buck converter topology.

FIG. 5 is a timing diagram of key voltages and currents of the converter shown in FIG. 4.

FIG. 6 is a schematic diagram of a second embodiment of the present invention configured in a buck converter topology.

FIG. 7A is a partial block and schematic diagram of an exemplary switch control means according to the present invention.

FIG. 7B is a timing diagram of key voltages and current of the exemplary control means shown in FIG. 7A.

FIG. 8 is a schematic diagram of a third embodiment of the present invention configured in a buck converter topology.

FIG. 9 is a schematic diagram of a fourth embodiment of the present invention configured in a buck converter topology.

FIG. 10 is a schematic diagram of a fifth embodiment of the present invention configured in a buck converter topology.

FIG. 11 is a schematic diagram of a sixth embodiment of the present invention configured in a buck converter topology.

FIG. 12A is a schematic diagram of a seventh embodiment of the present invention configured in a boost converter topology.

FIG. 12B is a schematic diagram of a eighth embodiment of the present invention configured in a boost converter topology.

FIG. 13A is a schematic diagram of a ninth embodiment of the present invention configured in a buck-boost converter topology.

FIG. 13B is a schematic diagram of a tenth embodiment of the present invention configured in a buck-boost converter topology.

FIG. 14A is a schematic diagram of an eleventh embodiment of the present invention configured in a flyback converter topology.

FIG. 14B is a schematic diagram of a twelfth embodiment of the present invention configured in a flyback converter topology.

FIG. 15 is a schematic diagram of an thirteenth embodiment of the present invention configured in a uk converter topology.

FIG. 16 is a schematic diagram of a fourteenth embodiment of the present invention configured in the secondary circuit of a forward converter topology.

DETAILED DESCRIPTION OF THE INVENTION

A first embodiment of the converter according to the present invention is shown at 100 in FIG. 4. Converter 100 includes an input port 101 coupled to a power source 2 for receiving a source of input power, and an output load for coupling to a load 3 and providing converted power thereto. Source 2 preferably comprises a voltage $V_1$ at one terminal, its positive terminal, and a ground reference potential at its other terminal. Additionally, converter 100 comprises a first switch means 110, a second switch means 120, an intermediate node 104, a first inductor 105, an output filter capacitor 106, and a switch control means 150. First inductor 105 comprises a first magnetic storage means for storing energy in the form of a magnetic field. In the embodiment of the present invention shown in FIG. 4, magnetic storage means 105 comprises an inductor having a winding and preferably including a ferromagnetic core. In other embodiments of the present invention discussed below, the first magnetic storage means may comprise two windings magnetically coupled to one another, such as for example a transformer.

Switch means 110 and 120 are coupled in series at intermediate node 104, and the serial combination is coupled across input port 101. As described in greater detail below, a capacitance 144 is coupled between node 104 and a reference potential, such as ground. Filter capacitor 106 is coupled across output port 102 and inductor 105 is coupled between node 104 and output port 102. In a preferred embodiment of converter 100, switch means 110 comprises an n-type power switching FET transistor 112 and a rectifier 111 coupled between the conduction terminals of transistor 112 (e.g., source and drain), and switch means 120 comprises an n-type power switching FET transistor 122 and a rectifier 121 coupled between the conduction terminals of transistor 122 (e.g., source and drain). Rectifiers 111 and 121 may be implemented by discrete components separate from transistors 112 and 122, respectively, or may comprise the body diodes within the components implementing transistors 112 and 122, respectively.

Switch control means 150 generates control signals at two ports 151 and 152, which are coupled to switch means 110 and 120, respectively, and direct the operation thereof. In a preferred embodiment of converter 100, each of the control signals at ports 151 and 152 is coupled between the control terminal (e.g., gate) and a conduction terminal (e.g., source) of transistors 112 and 122, respectively. Each of ports 151 and 152 includes two electrical lines for this purpose, one line coupled to the control terminal and the other coupled to the conduction terminal. Also in a preferred embodiment of converter 100, transistors 112 and 122 are alternately switched between conductive and non-conductive states by switch control means 150 such that neither of transistors 112 and 122 are rendered conductive at the same time.

Switch means 110 and control means 150 collectively comprise means for periodically coupling energy present at input port 101 to inductor 105 (the first magnetic storage means) in a plurality of consecutive cycles, each cycle comprising an ON period wherein energy is coupled to inductor 105 from input port 101 (switch means 110 conducting) and an OFF period wherein energy is not coupled to inductor 105 (switch means 110 not conducting). Additionally, switch means 120 comprises a rectifying device coupled to inductor 105 for enabling energy stored in inductor 105 during each ON period to be coupled to output port 102 during the subsequent OFF period. A pulse-width modulated voltage is coupled to inductor 105 and averaged (or filtered) by inductor 105 to provide a regulated output voltage at port 102. The ripple current in inductor 105 is designed to be small, preferably on the order of 10% to 20% of the maximum load current. In comparison to transition resonant converter 30 described above, this provides a low ripple current in capacitor 106, and nearly square current waveforms through transistors 112 and 122 for a minimum of RMS current conduction, and hence current conduction losses.

In this way, converter 100 is configured and operated as a buck-type converter with switch means 110 as the "primary switch" and switch means 120 as the "synchronous rectifier" device. When transistor 112 is conducting, current is flowing into node 104 from the positive terminal of source 2. When transistor 122 is conducting, current is flowing into node 104 from the ground reference potential, in the forward conduction direction of rectifier 121. As such, rectifier 121 is susceptible to conducting a reverse recovery current as described above. To prevent the occurrence of the reverse recovery current in switch means 120, converter 100 further comprises a reversal circuit according to the present invention for reversing the direction of current flow in switch means 120, including rectifier 121, during a time interval just prior to the end of each OFF period such that the conduction of current by switch means 120 is substantially reduced. In the embodiment shown in FIG. 4, the reversal circuit couples current into intermediate node 104 during a time interval just prior to when transistor 122 is to be rendered non-conductive such that the current flow in transistor 122 (and switch means 120) preferably reverses to a direction opposite to the forward conduction direction of rectifier 121. In this way, rectifier 121 is preferably placed in its reverse conducting mode before transistor 122 is rendered non-conductive, thereby preventing the generation of a reverse recovery current in rectifier 121 after transistor 122 is rendered non-conductive. However, as discussed in greater detail below, the effects of the reverse recovery current may be substantially reduced by substantially reducing the magnitude of forward current through rectifier 121 (i.e., without reversing to the opposite direction) before rendering transistor 122 conductive. Thus, substantial benefits may be obtained with the present invention even if the rectifier current is not reversed.

In general and as indicated above, the reversal circuit according to the present invention comprises an energy source, a second magnetic storage means, and a reversal switch means for coupling the second magnetic storage means to the energy source. During each OFF period, the reversal switch means closes in a time interval just prior to the end of the OFF period and causes a reversing current to be generated in the second magnetic storage means. The reversal circuit further comprises means for coupling the reversing current to switch means 120, the rectifying device. In the embodiment shown in FIG. 4, the reversal circuit comprises a third switch means 130 as the reversal switch means, a second inductor 140 as the second magnetic storage means, and an energy source 142 having a voltage $V_2$. Switch control means 150 preferably also controls the operation of switch means 130 in conjunction with the operation of switch means 110 and 120. Third switch means 130, second inductor 140, and energy source 142 are coupled in series, and the series combination is coupled between intermediate node 104 and a reference potential, such as ground. Switch control means 150 includes a third output port 153 for directing the operation of switch means 130. The coupling to node 104 provides means for coupling the reversing current to switch means 120. Other exemplary coupling means are described below.

In a time interval before transistor 122 is to be rendered non-conductive, switch control means 150 closes third switch means 130, coupling a voltage substantially equal to V: across inductor 140 (node 104 being substantially grounded by transistor 122). In response to the applied voltage, the current in inductor 140 increases substantially linearly with time. In a preferred embodiment of the present invention, the inductance of inductor 140 is roughly sixty times smaller than that of inductor 105, generally being in the range of 1/16th to 1/125th of inductor 105. As such, the current in inductor 140 quickly ramps up to that of inductor 105, at which point the current through switch means 120 goes substantially to zero. A further increase in current through inductor 140 then reverses the direction of current flow in switch means 120, ensuring that diode 121 is reverse biased. Transistor 122 is then rendered non-conductive without a reverse recovery current generated by diode 121. A substantial portion of the current flowing in inductor 140 is coupled to inductor 105 and the remaining portion is coupled to capacitance 144, which raises the voltage of intermediate node 104. Rectifier 111 limits the rise in voltage by conducting current back to the input source 2. Transistor 112 is then rendered conductive without forming a short circuit to ground with rectifier 121. Sufficient energy may be stored in inductor 140 to raise the voltage across capacitance 144 to the level of the input voltage $V_1$ so as to provide a substantially zero-voltage switching condition on switch means 112, thereby reducing switching losses. However, it is currently believed by the inventors that the overall power dissipation of converter 100 may not necessarily be minimized by storing the amount of energy needed to enable zero-voltage switching on transistor 112. This is because some power is dissipated by the reversal circuit by storing energy in inductor 140. It is believed that this power dissipation should be balanced against the switching losses of transistor 112.

In a preferred embodiment of the present invention, while transistor 122 is conducting during the time third switch means 130 is closed, the voltage drop across transistor 122 is less than the voltage needed to cause forward current conduction in rectifier 121 (e.g., ~0.2 V to ~+0.2 V for transistor 122 versus ~+0.7 V for diode 121). As such, there is little possibility of rectifier 121 becoming forward biased, and thereby storing the charge which causes the reverse-recovery current. With the injected reversing current from inductor 140 and third switch means 130, the voltage at node 104 is driven positive when transistor 122 is rendered non-conductive. This maintains rectifier 121 in a reverse-biased state. Without the injected current from inductor 140 and third switch means 130, the voltage at node 104 would be drawn negative by inductor 105 when transistor 122 is rendered non-conductive. This would cause rectifier 121 to become forward biased, limiting the negative voltage excursion of node 104 and storing charge in rectifier 121, which in turn would cause a reverse-recovery current to flow as soon as transistor 112 is rendered conductive.

When switch means 120 is rendered non-conductive, the energy stored in inductor 140 is coupled to the load (via inductor 105) and/or to input source 2 (via rectifier 111), where it may be stored for later coupling to the load during the next closed state of switch means 110. The voltage $V_2$ of source 142 is preferably less than the voltage $V_1$ of input source 2 so that a negative voltage may be applied to inductor 140 when switch means 110 closes. The negative voltage causes the current in inductor 140 to be reduced to zero (substantially linearly) in preparation for the next switching cycle. Third switch means 130 is opened once the current in inductor 140 reaches zero. This preferably occurs before the beginning of the subsequent OFF period.

When switching transistor 122 is in an OFF state, capacitance 144 functions to couple (i.e., "absorb") the excess current from inductor 140 which is not coupled to inductor 105 and to generate a positive voltage at node 104. Capacitance 144 represents the combined stray (parasitic) capacitances of switch means 110 and 120, inductor 105, and the series combination of switch means 130 and inductor 140. It may be appreciated that each of these components (110, 120, 105, 130 and 140) may include a parasitic capacitance, resulting from the non-ideal elements used in implementing the components. The parasitic capacitance of each of these components may, for example, be represented by a parasitic capacitor for each component terminal, each parasitic capacitor being coupled between its respective component terminal and ground. In addition to absorbing excess current from inductor 140, capacitance 144 influences the rate of change in voltage at node 104 and, consequently, the EMI generated by node 104. In one embodiment of the present invention, capacitance 144 further comprises a standard (i.e., non-stray) capacitor to increase its capacitance. The increased capacitance reduces the rate of change in the voltage, thereby reducing the EMI generated at node 104.

A more detailed description of the operation of converter 100 is now given with reference to an exemplary timing diagram of key signals, voltages and currents of circuit 100 shown at 180 in FIG. 5 under an exemplary operating condition. The voltages and current shown in diagram 180 are shown as a function of time and their reference directions are indicated in FIG. 4 by corresponding designations. The control signals to switching transistor devices 112 and 122 are shown at timing diagrams 181 and 182, respectively, where the high portion indicates a closed state (conductive) and a low portion indicates an open state (non-conductive). The voltage at intermediate node 104 with respect to ground is shown at a timing graph 183 in FIG. 5 and is designated as $V_{104}$ in FIGS. 4 and 5. The current through inductor 105 is shown at a timing diagram 184 and is designated as $I_{L1}$; the current into capacitance 144 is shown at a timing graph 185 and is designated as $I_C$; the current through inductor 140 is shown at a timing graph 186 and is designated as $I_{L2}$; the current through switch means 110 is shown at a timing graph 187 and is designated as $I_{SW1}$; and the current through switch means 120 is shown at a timing graph 188 and is designated as $I_{SW2}$. Also shown in timing diagram 180 are a number of time points $t_0$ through $t_7$, each time point being represented by a dashed line passing vertically through graphs 181–188.

One complete switching cycle for converter 100 occurs between times $t_1$ and $t_7$. Switching transistor device 112 is rendered conductive near time $t_2$ and rendered non-conductive at time $t_4$, as shown in graph 181. Switching transistor device 122 is rendered conductive near time $t_5$ and non-conductive at time $t_7$, as shown in graph 182. Neither of switch means 110 and 120 is conducting substantial current during the time intervals from $t_1$ to $t_2$ and $t_4$ to $t_5$. During these intervals, the voltage $V_A$ at node 104 is changing values (cf. graph 183) and current is being conducted into and out of capacitance 144 (cf. graph 185). The time duration between $t_0$ and $t_6$ also represents a complete switching cycle for converter 100, shifted from time $t_1$ and $t_7$ by a predetermined amount. The operation of converter 100 at each time point and between time points is described below.

Prior to time $t_0$, switch means 120 is in an ON-state and current is flowing through switch means 120 to inductor 105 (cf. graph 188), with inductor 105 discharging its stored energy to load 3 (the "free-wheeling" phase, cf. graph 184). During this time, the current flowing into node 104 from switch means 120 ($I_{SW2}$) is substantially equal to the current flowing out from node 104 into inductor 105 ($I_{L1}$), cf. graphs 184 and 188. At time $t_0$, third switch means 130 is closed, coupling energy source 142 to inductor 140. From time $t_0$ to time $t_1$, the current $I_{L2}$ through inductor 140 increases substantially linearly (cf. graph 186), flowing into node 104. The current flowing out of node 104 is substantially set by the voltage across inductor 105, which is in turn set by capacitor 106 at one terminal and ground at the other terminal (node 104) by switch means 120 being closed. The current drawn from node 104 by inductor 105 ($I_{L1}$) is supplied by both switch means 120 and inductor 140, and decreases relatively slowly in comparison to the increasing current $I_{L2}$ in inductor 140 (cf. graphs 184 and 186). As a result, the current $I_{SW2}$ in switch means 120 decreases from a large negative value at time $t_0$ to a small positive value at time $t_1$, reversing the current flow in switch means 120 (cf. graph 188). At time $t_1$, inductor 140 is coupling a portion of its current through switch means 120 to ground. Transistor 122 may now be opened without generating a reverse recovery current in rectifier 121.

At time $t_1$, transistor 122 is rendered non-conductive by switch control means 150. Third switch means 130 remains conductive. The current $I_{L2}$ in inductor 140 then flows into both inductor 105 and capacitance 144 (cf. graphs 184–186), raising the voltage at node 104 towards the positive supply voltage $V_1$ (cf. graph 183). Switch means 110 may now be closed (rendered conductive) by one or both of transistor 112 and rectifier 111. Once switch means 110 is closed, the voltage $V_{104}$ at node 104 is substantially set to a voltage of $V_1$ and the current flow into capacitor 144 goes to substantially zero at time $t_2$ (cf. graph 185).

To prevent a reverse recovery current in rectifier 121, switch means 110 should be closed while the voltage of node 104 is positive (i.e., greater than $\sim -0.5$ V). The closing of switch means 110 occurs at time $t_2$. For the exemplary waveforms of timing diagram 180, sufficient energy has been stored in inductor 140 to enable inductor 140 to charge the voltage of node 104 up to the input voltage at time $t_2$, at which point rectifier 111 of first switch means 110 conducts. A short time duration later, switch control means 150 causes transistor 112 to become conductive. However, it is not necessary for switch control means 150 to render transistor 112 conductive after rectifier 111 conducts in order to prevent a reverse-recovery current in rectifier 121. In fact, transistor 112 may be rendered conductive before voltage $V_{104}$ rises to the input voltage so long as the voltage at node 104 is greater than $\sim -0.5$ V when transistor 112 is rendered conductive. However, as indicated above, rendering transistor 112 conductive after rectifier 111 conducts has the advantage of reducing the turn-on power dissipation in transistor 112.

With first switch means 110 closed at time $t_2$ and with the voltage $V_2$ of source 142 being less than the voltage $V_1$ of input source 2, a negative voltage is applied across inductor 140. As a result, the current $I_{L2}$ through inductor 140 decreases at a substantially constant rate (cf. negative ramp in graph 186 after time $t_2$). At time $t_3$, the current $I_{L2}$ in inductor 140 reaches zero and third switch means 130 is rendered non-conductive (open) by switch control means 150. This preferably occurs before the next OFF-period. During the time interval $t_2$–$t_3$, the current $I_{L2}$ from inductor 140 and the current $I_{SW1}$ from switch means 110 flow into inductor 105 (cf. graphs 186 and 187). If the magnitude of $I_{L2}$ at time $t_2$ is greater than the current $I_{L1}$ drawn by inductor 105 at time $t_2$, a portion of the current $I_{L2}$ in inductor 140 will flow into rectifier 111 of switch means 110 towards source 2 during the initial portion of time interval $t_2$–$t_3$. This possible condition is shown in graph 187 as a negative current for $I_{SW1}$.

Between times $t_3$ and $t_4$, switch means 110 is conductive and couples power to inductor 105 and load 3. At time $t_4$, switch means 110 is rendered non-conductive. The current $I_{L1}$ in inductor 105 draws charge from capacitance 144, and discharges capacitance 144 (cf. graph 185) and reduces the voltage $V_{104}$ of node 104 (cf. graph 183). At time $t_5$, the voltage $V_{104}$ reaches zero volts and rectifier 121 conducts to supply the current $I_{L1}$ drawn by inductor 105. A short time duration later, switch control means 150 renders transistor 122 conductive, causing the current conducted by switch means 120 to shift over from rectifier 121 to transistor 122. Alternatively, transistor 122 may be closed before voltage $V_{104}$ reaches zero and before rectifier 121 conducts, so long as it is closed after switch means 110 (i.e., transistor 112) is rendered non-conductive.

During the time interval $t_5$–$t_6$, the current through inductor 105 is provided by transistor 122 and any stored minority-carrier charge in rectifier is 121 discharged. Transistor 122 remains conductive until time $t_6$, at which point third switch means 130 is again rendered conductive. Time $t_6$ corresponds to time to in the switching cycle of converter 100 and the time duration between time $t_6$ and $t_0$ is the length of one switching cycle. The time interval from $t_5$ to $t_6$ is preferably of sufficient duration to enable the minority charge stored in rectifier 121 to be substantially discharged to prevent any subsequent generation of a reverse recovery current. Minority carrier charge may also be discharged in the subsequent $t_0$–$t_1$ interval. If the minority carriers are not substantially completely discharged during interval $t_5$–$t_6$ and the subsequent interval $t_0$–$t_1$, a reverse-recovery current will occur. However, as the time duration of the reverse-recovery current is related to the amount of stored minority carriers, the time duration of the reverse-recovery current will be much smaller than that for the synchronous buck converter, such as converter 20. Consequently, power dissipation losses are still reduced even in those cases where all the minority carrier charge is not removed.

In fact, the effects of the reverse-recovery current may be substantially reduced by substantially reducing the magnitude of the rectifier's forward current before switching. It is therefore not necessary to reverse the rectifier current to the opposite direction. This is because the time duration of the reverse-recovery current is related to the amount of stored minority carriers, which in turn is related to the magnitude of the forward current. Thus, by reducing the forward rectifier current before switching, the time duration of the reverse-recovery current is correspondingly reduced. Thus, substantial benefits may be obtained with the present invention even if the rectifier current is not reversed.

The following exemplary component values and converter parameters are provided in TABLE I to aid one of ordinary skill in the art in making and using the present invention. These values and parameters are not intended to limit the present invention in any manner.

TABLE I

| Input Voltage | 25 V |
|---|---|
| Output Voltage | 5 V |
| Switching Period | 5 us |

TABLE I-continued

| | |
|---|---|
| Max. Output Current | 10 A |
| $L_{105}$ Ripple Current | 2 A |
| $L_{105}$ | 10 uH |
| $L_{140}$ | 0.16 uH |
| ON Voltage-drop of S.M. 130 | ~1 V |
| Voltage of Source 142 | 5 V |
| Typical Time for $t_5$–$t_7$ | 4 us |
| Typical Time for $t_0$–$t_1$ | 0.4 us |

As indicated above, converter 100 is configured in a buck converter topology. From the above description of the operation of converter 100 in the buck-conversion mode, it is clear that source 142 should preferably have a voltage which is less than the input voltage from source 2 and that third switch means 130 need only conduct current in one direction. As such, energy source 142 may comprise (i.e., may be implemented by) the output voltage across filter capacitor 106, and the third switch means for coupling power to inductor 140 may comprise a switching transistor device coupled in series with a rectifier which is oriented to stop conducting substantially at time $t_3$. An embodiment of the present invention with these implementations is shown at 200 in FIG. 6. With the exception of third switch means 130, converter 200 comprises all the elements of converter 100 and, as such, the same reference numerals for the corresponding elements have been used. In place of switch means 130, converter 200 comprises a third switch means 230 as the reversal switch means according to the present invention. Switch means 230 comprises the same functions as switch means 130 above, opening and closing as indicated above. Reference numeral 142 points to the output voltage across capacitor 106 and output port 102.

Third switch means 230 includes a series combination of a switching transistor 232 and a rectifier 234, with the series combination being coupled between inductor 140 and energy source 142. Transistor 232 preferably includes a field-effect transistor device having its gate (control) terminal and source (conduction) terminal coupled to port 153 of switch control means 150. Rectifier 234 is oriented to enable current to flow from source 142 to second inductor 140 and to block current from flowing into source 142 from inductor 140. Switch control means 150 renders transistor 232 conductive at time $t_0$ (cf. FIG. 5), a predetermined time before transistor 122 is rendered non-conductive at time $t_1$. Switch means 230 is preferably rendered non-conductive by rectifier 234 at time $t_3$ when the current through second inductor 140 decreases to zero amperes and attempts to go negative. Transistor 232 may then be rendered non-conductive by switch control means 150 at some point after $t_3$ and before $t_4$. With rectifier 234, the timing of the shutoff signal at port 153 to transistor 232 is not critical.

Rectifier 234 may comprise a schottky type rectifier to reduce its reverse-recovery time and minimize the amount of reverse-recovery current generated by rectifier 234. Transistor 232 preferably comprises an n-channel enhancement-mode MOSFET device, but may comprises a bipolar transistor device or a four-layer bipolar switch (e.g., SCR). It may be appreciated that, since transistor 232 is switched on and off under zero-current conditions (eft times $t_0$ and $t_3$ in graph 186 of FIG. 5), a variety of bipolar devices may be used.

An exemplary embodiment for switch control means 150 according to the present invention is shown at 300 in FIG. 7A. Key voltages of control means 300 are shown in a timing diagram 350 in FIG. 7B as a function of time. Switch control means 300 includes three output ports 301, 302, and 303 for coupling control signals to the switching transistors of switch means 110, 120, and 230 (or 130), respectively. Output ports 301–303 correspond to output ports 151–153, respectively, of switch control means 150. Switch control means 300 further includes a pulse-width modulated (PWM) control circuit 310 which generates a pulsed signal at an output 311. The pulsed signal alternates between two voltage levels and is shown in a graph 351 in FIG. 7B. In one embodiment of control means 300, the voltage levels are approximately 10 V and 0 V. The pulsed signal at output 311 may be generated with a fixed duty-cycle, or may be generated with a variable duty-cycle which is adjusted to regulate the output voltage of the converter to be within a predetermined range around a predetermined target value. Such PWM control circuitry is well known in the power conversion art and a detailed explanation thereof is not needed for one of ordinary skill in the art to understand the present invention and to make and use the same.

Additionally, switch control means 300 comprises a first isolation transformer 320 and second isolation transformer 340, each being responsive to the pulsed signal at output 311. First transformer 320 is for driving and isolating the transistors of switch means 110 and 120, and second transformer 340 is for driving and isolating the transistor of switch means 230. Second transformer 340 includes a primary winding 341 coupled to output 311 by way of a DC blocking capacitor 312, and a secondary winding 342 coupled to port 303 by way of a capacitor 347. As is known in the art, the voltage across blocking capacitor 312 adjusts to a value which causes the volt-seconds applied to primary winding 341 to be substantially zero during each switching cycle in steady-state operation. This prevents the flux in the core of transformer 340 from saturating due to a DC voltage. As a result, an "AC"-like voltage appears across both windings 341 and 342. Capacitor 347 and a rectifier 348 "DC-restore" this voltage at port 303 such that the voltage at port 303, the output control signal for switching means 230, has substantially positive values (i.e., greater than −0.5 V), as is known in the converter art. The voltage at port 303 is shown in a graph 355 in FIG. 7B.

The voltages coupled to ports 301 and 302 for output as control signals to switch means 110 and 120, respectively, are generated in a similar manner except that delay circuits are included to provide the desired timing between the three switch means, as described above. First isolation transformer 320 includes a primary winding 321 coupled to output 311 by way of a delay circuit which includes a resistor 315, a capacitor 317, a rectifier 316, and a buffer driver 318. A DC blocking capacitor 319 is coupled between the output of driver 318 and winding 321 and provides the same DC blocking function for transformer 320 as capacitor 312 provides for transformer 340. Resistor 315 is coupled between output 311 and the input of driver 318, and capacitor 317 is coupled between the input of driver 318 and ground, forming an RC delay circuit with resistor 315. Normally, the RC circuit delays the propagation of both the rising and falling transitions of the signal at output 311 to the input of driver 318 since capacitor 317 must be charged and discharged through resistor 315. However, rectifier 316 is coupled in parallel with resistor 315, with its cathode coupled to output 318, and substantially decreases the propagation delay for the falling edge by shunting the resistance of resistor 315. In one embodiment of the present invention, buffer driver 318 further includes a Schmitt-trigger input to provide fast rising and falling transitions at its output. The voltage at the output of driver 318 is shown in a timing diagram 352 in FIG. 7B, with the time delay indicated at 360.

Transformer 320 further includes a secondary winding 322 which is coupled to port 301 by way of a DC-restore capacitor 327 and another delay circuit which includes a resistor 325, a capacitor 326, and a rectifier 324. Resistor 325 is coupled between secondary winding 322 and capacitor 326, and rectifier 324 is coupled in parallel with resistor 325, with its cathode coupled to the dotted (positive) terminal of winding 322. This delay circuit functions in the same manner as the above-described delay circuit formed by components 315–317. The rising transition of the voltage across winding 322 is delayed by capacitor 326, but the falling edge is not substantially delayed. The voltage across capacitor 326 is coupled to port 301 by capacitor 327. Capacitor 327 and a rectifier 328 "DC-restore" the voltage at port 301 such that is has substantially positive values (i.e., greater than −0.5 V), as is known in the converter art. The voltage at port 301 is shown in a graph 353 in FIG. 7B. The effect of the delay circuit is seen at 362 by the slower rise time for the rising transition.

Transformer 320 further includes a third winding 323 which is coupled to port 302 by way of a DC-restore capacitor 337 and another delay circuit which includes a resistor 335, a capacitor 336, and a rectifier 334. The orientation of third winding 323 to port 302 is opposite that of secondary winding 322 to port 301. Because of this difference, the signals at ports 301 and 302 are generated in an anti-phase manner (i.e., one is low when the other is high). Resistor 335 is coupled between third winding 323 and capacitor 336, and rectifier 334 is coupled in parallel with resistor 335, with its cathode coupled to the un-dotted (negative) terminal of winding 323. This delay circuit functions in the same manner as the above-described delay circuit formed by components 315–317. The rising transition of the voltage across winding 323 (as referenced from the negative terminal of capacitor 336) is delayed by capacitor 336, and the falling edge is not substantially delayed. Capacitor 337 and a rectifier 338 "DC-restore" the voltage at port 302 such that is has substantially positive values (i.e., greater than −0.5 V), as is known in the converter art. The voltage at port 302 is shown in a graph 354 in FIG. 7B. The effect of the delay circuit is seen at 364 by the slower rise time for the rising transition for $V_{302}$.

As can be seen by comparing graphs 353 and 354, the signal at port 301 rises at 362 substantially after the signal at port 302 falls. With transistors 112 and 122 preferably having positive threshold voltages, transistor 122 (at port 302) is turned off before transistor 112 (at port 301) is turned on. The approximate delay between turn off and turn on is shown at 366 in graphs 353 and 354. In a similar manner, the signal at port 302 rises at 364 substantially after the signal at port 301 falls. Again with positive threshold voltages, transistor 112 (at port 301) is turned off before transistor 122 (at port 302) is turned on. The approximate delay between turn off and turn on is shown at 368 in graphs 353 and 354. As can be seen by comparing graphs 354 and 355, the signal at port 303 enters its pulsed state a predetermined time before the signal at port 302 turns off transistor 122.

This time is shown at 370 in graphs 354 and 355. The signal at port 303 renders transistor 232 conductive and causes the reversing current to be generated in second inductor 140 (cf. FIG. 6) before transistor 122 is to be rendered non-conductive. As indicated above, rectifier 234 renders switch means 230 non-conductive once the stored energy in second inductor 140 has been discharged, which generally occurs before transistor 112 is turned off and transistor 122 is turned on. The signal at port 303 maintains transistor 232 conductive until shortly before transistor 112 is turned off and transistor 122 is turned on.

Returning to converter 200 shown in FIG. 6, the output voltage of convertor 200 is a convenient supply of energy for second inductor 140. However, if the output voltage is very low, for example 2.2 V or 3 V, the voltage drop across transistor 232 and rectifier 234 may leave only 1 V to 2 V available to be applied to inductor 140. A solution to this problem is provided by a third converter embodiment of the present invention shown at 400 in FIG. 8. Except for inductor 105, each element of converter 400 is the same as the corresponding element of converter 200, and consequently the same reference numeral has been used for each element. In place of inductor 105, converter 400 comprises a magnetic storage means 405 having a first winding 406 coupled between intermediate node 104 and filter capacitor 106, and a second winding 407 coupled in series with source 142 and second inductor 140. Second winding 407 is magnetically coupled to first winding 406 and is oriented such that it may coupled a positive voltage from first winding 406 during the time interval $t_0$–$t_1$. Windings 406 and 407 may be tightly coupled to one another, as for example in a transformer implementation, or may be more loosely coupled, as for example two windings disposed separate from one another on a common core. The voltage across winding 407 adds constructively with the voltage provided by source 142 (the output voltage), and thereby raises the potential applied to second inductor 140 to solve the above-indicated problem. During the time interval $t_0$–$t_1$, the voltage across first winding 406 is provided by the voltage at output port 102. It may be appreciated that second winding 407 functions as an energy source in much the same way as source 142. The additional energy source is indicated by a reference numeral 442.

As an example, take an output voltage of 2.5 V and a 1:1 turns ratio between windings 406 and 407. During the time interval to $t_0$ $t_1$, approximately 2.5 V is generated across winding 407, with the positive voltage at the "dotted" terminal. As node 104 is grounded during this time, second winding 407 therefore applies approximately −2.5 to the left terminal of second inductor 140. At the same time, source 142 (the output voltage) applies approximately +1.5 V (2.5 V less ∼1 V voltage drop) to the right terminal of second inductor 140. The total voltage applied to second inductor 140 is approximately 4V (∼1.5−(−2.5V)). Of course, the turns ratio between windings 406 and 407 may be adjusted to provided more or less applied voltage to second inductor 140.

In converter 400, the current in second switch means 120 is reversed during the time interval $t_0$–$t_1$ by two processes. In the first process, the reversing current flows through second inductor 140, third switch means 230, and second winding 407 and is directly coupled into node 104. As the second process, the reversing current flowing through second winding 407 is transformed over to first winding 406 by transformer action and is then coupled to node 104. The transformed current has a direction opposite to that of the current normally flowing from node 104 to load 3 and therefore lessens the total current drawn from node 104 by first winding 406. Thus, windings 406 and 407 synergistically aid second inductor 140 and switch means 230 in reversing the current by providing more voltage to second inductor 140 and by mirroring the reversing current in first winding 406. For example, taking a 1:1 turns ratio and near ideal transformer coupling between windings 406 and 407, the reversing current coupled to node 104 is double the current in second inductor 140.

Given that the inductance of second inductor 140 is typically small (e.g., 0.16 uH), inductor 140 may be implemented by the self-inductance, or leakage inductance, of second winding 407. More specifically, magnetic storage means 405 may comprise a real transformer having a primary winding as winding 406, a secondary winding as winding 407, and a secondary leakage inductance substantially comparable to that of second inductor 140. As such, an inductor component apart from magnetic storage means 405 for implementing inductor 140 would not be required. In this case, the first magnetic storage means according to the present invention comprises the second magnetic storage means.

The turns ratio between windings 406 and 407 may be adjusted to enable second winding 407 to provide all the voltage applied to second winding 140 and to thereby allow source 142 to be eliminated. This is demonstrated by a fourth converter embodiment according to the present invention shown at 440 in FIG. 9 where the series combination of winding 407, inductor 140, and switch means 230 is coupled between node 104 and ground, and reference numeral 142 has been omitted. In place of reference numeral 142, a reference numeral 442 is shown in FIG. 9 to point to winding 407 as the source of energy for second inductor 140.

As in converter 400 shown in FIG. 8, two processes reverse the current flow through second switch means 120 in converter 440. First, the reverse current flows through second inductor 140, switch 230, and second winding 407 and is directly coupled to node 104. Second, the reversing current through winding 407 is transformed over to first winding 406, and the transformed current is coupled to node 104.

In a fifth embodiment according to the present invention shown at 460 in FIG. 10, the second process alone may be employed. Each element of converter 460 is the same as the corresponding element of converter 440, and consequently the same reference numeral has been used for each element. With the exception of elements 407, 140, and 230, the elements of converter 460 are coupled to one another in the same manner as the corresponding elements of converter 440. The series circuit of second inductor 140, second winding 407, and third switch means 230 is coupled to form a circuit loop, rather than being coupled between node 104 and ground. Additionally, the components have been rearranged to allow the source terminal of transistor 232 to be coupled to ground. This provides the advantage of referencing the gate-to-source voltage of transistor 232 to ground, and thereby enabling a more simple control circuit (i.e., one without an isolation transformer) to be used. Although changed, the series circuit of elements 140, 230, and 407 in converter 460 shares a common feature with that of converter 440. Specifically, the rectifier 234 is oriented such that current may flow out of the "dotted" terminal of second winding 407. As such, the series circuits in converters 440 and 460 function in the same way in coupling a reversing current through first winding 406.

In each of converters 100, 200, 400, 440, and 460 (shown in FIGS. 4, 6, 8, 9, and 10), transistor 122 of second switch means 120 provides the benefit of a lower voltage drop when transistor 122 is conducting. This benefit is apart from the benefit provided by second inductor 140 and the third switch means (130, 230) of preventing a reverse recovery current in rectifier 122 of switch means 120. Thus, it may be appreciated that the series circuit of second inductor 140 and third switch means 130, 230 may be applied to a free-wheeling rectifier as well as to switch means 120. In other words, the benefit of preventing a reverse recovery current would still be obtained even though transistor 122 is not included in switch means 120. In the future, rectifiers may be developed which have an on-state voltage drop comparable to that of transistor 122, thus potentially making the benefits of transistor 122 obsolete. A sixth embodiment of the present invention demonstrating the used of a free-wheeling rectifier is shown at 480 in FIG. 11. With the exception of switch means 120, converter 480 comprises the same elements as converter 100. Accordingly, the same reference numeral is used for corresponding elements. In place of second switch means 120, converter 180 comprises a rectifier 485, which is oriented in the same direction as diode 121. Additionally, port 152 of control means 150 and the associated means for generating the control signal at the port for switch means 120 are not required by converter 480. Like switch means 120, rectifier 485 comprises a rectifying device coupled between magnetic storage inductor 105 and output port 102 for coupling energy stored in inductor 105 during an ON period to output port 102 during the subsequent OFF period. In view of this embodiment, it will be apparent to one of ordinary skill in the art as to how rectifier 485 may replace switch means 120 in converters 200, 400, 440, and 460 and in additional converter embodiments described below.

OTHER CONVERTER TOPOLOGY CONFIGURATIONS

The present invention may be configured into other converter topologies, such as the boost, buck-boost, flyback, forward, and uk topologies, as well as other appropriate topologies. In doing so, the following steps are taken. First, switch means 110 and the free-wheeling rectifier are identified and, optionally, the rectifier is replaced by second switch means 120. Second, the first magnetic storage means (e.g., an inductor or transformer) and any appropriate components are designed such that the first magnetic storage means is operated in a continuous current mode. Third, the series combination of the third switch means (130, 230), second magnetic storage means (e.g., inductor 140), and energy source (142, 442) is coupled to the rectifying device (e.g., free-wheeling rectifier or second switch means 120) in a manner which can reverse the direction of current flow. And fourth, the third switch means is operated with respect to the operation of the rectifying device as described above, being closed prior to when conduction through the freewheeling rectifier or switch means 120 is to be stopped and preferably opened when the current in second inductor 140 falls to zero amperes.

Examples of the present invention configured into various converter topologies are now provided. A seventh embodiment of the present invention configured in a boost topology is shown at 500 in FIG. 12A. Converter 500 comprises the same elements as converter 200. Accordingly, the same reference numeral is used for corresponding elements. However, these element are arranged differently. First switch means 110 and second switch means 120 are coupled in series at node 104, as before. However the series combination of switch means 110 and 120 is coupled across output port 102 rather than input port 101. In the embodiment shown in FIG. 12A, switch means 120 is coupled to the more positive terminal of port 102. First inductor 105 is now coupled between input port 101 and node 104, instead of between output port 102 and node 104. As a common characteristic of boost-type converters, first inductor 105 (the first magnetic storage means) and switch means 120 (the rectifying device) form a series combination which is coupled between respective terminals of input port 101 and output port 102.

Switch means 110 and 120 operate as before in an alternating, non-overlapping manner. When switch means 110 is closed, current and energy are built up in first inductor 105 (ON period). Node 104 is grounded and second switch means 120 is open with no current flowing to port 102. When first switch means 110 is opened and second switch means 120 closed, the built-up current in first inductor 105 is directed to port 102 (OFF period). Node 104 rises to a voltage near the output voltage. The output voltage is greater than the input voltage because inductor 105 is discharging current from the potential level of the input voltage, hence the term boost topology.

As with converter 200, capacitance 144 is coupled to node 104, filter capacitor 106 and load 3 are each coupled across port 102, and input source 2 is coupled to port 101. Switch control means 150 is not expressly shown in FIG. 12A in order to simplify the visual complexity of converter 500. However, switch means 150 is coupled to each of the switch means as indicated above. Notations of the port couplings are shown in FIG. 12A and subsequent FIGS, and are clearly sufficient to those of ordinary skill in the art as to how switch control means 150 is interconnected to switch means 110, 120, and 230.

As in converter 200, second inductor 140 and third switch means 230 are coupled in series. The series combination is coupled between node 104 and input source 2 (port 101). The source of energy 142 is provided by the output voltage at capacitor 106 by way of switch means 120, which is conducting during the OFF period and thereby couples node 104 to output port 102 during this time. Rectifier 234 is oriented to conduct current from node 104 to port 101. To reduce or prevent the reverse-recovery current, third switch means 230 operates as before, being rendered conductive for a short time duration before second switch means 120 is to be rendered non-conductive. Second inductor 140 and third switch means 230 operate to reverse the current flow through second switch means 120 by drawing (coupling) current away from node 104 in a time period (corresponding to $t_0$–$t_1$) before second switch means 120 is to be rendered non-conductive. The current drawn by second inductor 140 subtracts from the current provided to node 104 by first inductor 105. The current drawn by second inductor 140 ramps up with time and soon equals the current being provided first inductor 105, leaving substantially no current conducted by second switch means 120. A short time later, after current in switch means 120 reverses, transistor 122 may be rendered non-conductive, as described above.

When switch means 120 and 230 are both conducting, a voltage of approximately $V_{OUT}$-$V_{IN}$ is applied across second inductor 140 to build up the reversing current, where $V_{OUT}$ is the output voltage at port 102 and $V_{IN}$ is the input voltage at port 101. After transistor 122 is rendered non-conducting and switch means 110 is rendered conductive, a voltage of approximately $-V_{IN}$ is applied across inductor 140 to remove stored energy from the inductor's magnetic field. The stored energy is provided to input source 2 where it may be recycled for later use or coupled to first inductor 105, and thereby not wasted.

It may be appreciated that, as described above in FIG. 11, a rectifier may be used in place of second switch means 120 in converter 500 as the rectifying device. Additionally, other variations of second inductor 140, the third switch means (130, 230), and the energy source (142, 442) described above in FIGS. 4, and 8–10 may be applied in the boost topology. As an example, an eighth embodiment of the present invention configured in a boost topology and having the variation of converter 460 of FIG. 10 is shown at 520 in FIG. 12B. Converter 520 comprises the same elements as converter 460. Accordingly, the same reference numeral is used for corresponding elements. However, these elements are arranged differently. First switch means 110 and second switch means 120 are coupled in series at node 104, as before. However, the series combination of switch means 110 and 120 is coupled across output port 102 instead of input port 101. In the embodiment shown in FIG. 12B, switch means 120 is coupled to the more positive terminal of port 102. These arrangements are the same as those for converter 500.

In converter 520, first winding 406 is coupled between input port 101 and node 104 rather than output port 102 and node 104, as in converter 460. As a common characteristic of boost-type converters, winding 406 of transformer 405 (the first magnetic storage means) and switch means 120 (the rectifying device) form a series combination which is coupled between respective terminals of input port 101 and output port 102. Switch means 110 and 120 operate as before in an alternating, non-overlapping manner. When switch means 110 is closed, current and energy are built up in first winding 406 and magnetic storage means 405, respectively (ON period). Node 104 is grounded and second switch means 120 is open with no current flowing to port 102 from winding 406. When first switch means 110 is opened and second switch means 120 closed, the built-up current in first winding 406 is directed to port 102 (OFF period). Node 104 rises to a voltage near the output voltage, with the output voltage being greater than the input voltage, as in converter 500.

As with converter 460, capacitance 144 is coupled to node 104, filter capacitor 106 and load 3 are each coupled across port 102, and input source 2 is coupled to port 101. Switch control means 150 is not expressly shown in FIG. 12B in order to simplify the visual complexity of converter 520. However, control means 150 is coupled to each of the switch means as indicated above. Notations of the port couplings are shown in FIG. 12B and are clearly sufficient to those of ordinary skill in the art as to how control means 150 is interconnected to switch means 110, 120, and 230.

As in converter 460, second inductor 140, third switch means 230, and second winding 407 are coupled in a series loop, with transistor 232 oriented such that its source terminal is coupled to ground. This provides the advantage of referencing the gate-to-source voltage of transistor 232 to ground, and thereby enabling a more simple control circuitry (i.e., one without an isolation transformer) to be used. As in converter 460, rectifier 234 is oriented such that current may flow out of the "dotted" terminal of second winding 407. Third switch means 230 also operates as before, being rendered conductive a short time duration before second switch means 120 is to be rendered non-conductive. When transistor 232 is closed, the voltage across second winding 407 is applied across second inductor 140, and the reversing current is generated. The reversing current is transformed over to first winding 406 by transformer action, where it causes a current to flow from node 104 to input port 101. This reverses the current flow through second switch means 120 by drawing (coupling) current away from node 104 in a time period ($t_0$–$t_1$) before second switch means 120 is to be rendered non-conductive.

A ninth embodiment of the present invention configured in a buck-boost topology is shown at 540 in FIG. 13A. Converter 540 comprises the same elements as converter 200. Accordingly, the same reference numeral is used for corresponding elements. However, these elements are arranged differently. Each of ports 101 and 102 has a positive terminal and a negative terminal. The positive and negative terminals of port 102 of converter 540 are reversed from those of converter 200. First switch means 110 and second switch means 120 are coupled in series at node 104, as in converter 200, but the series combination of switch means 110 and 120 in converter 540 is coupled between respective first terminals of ports 101 and 102 (e.g., positive terminal of port 101 and negative terminal of port 102), rather than across input port 101. First switch means 110 is coupled to input port 101 and second switch means 120 is coupled to port 102.

Instead of being coupled between output port 102 and node 104, first inductor 105 of converter 540 has one terminal coupled to node 104 and a second terminal coupled to each of the second terminals of ports 101 and 102 (e.g., negative terminal of port 101 and positive terminal of port 102). As such, inductor 105 (the first magnetic storage means) is coupled in series with switch means 120 (the rectifying device) at node 104, and the series combination is coupled in parallel with output port 102. Switch means 110 and 120 operate as before in an alternating, non-overlapping manner. When switch means 110 is closed, current and energy are built up in first inductor 105 (ON period). Node 104 is coupled to the positive terminal of port 101 and second switch means 120 is open with no current flowing to port 102 from inductor 105. When first switch means 110 is opened and second switch means 120 closed, the built-up current in first inductor 105 is directed to port 102 in a direction opposite to that in converter 200 (OFF period). Because of this and because the positive terminal of port 102 is connected to the negative (ground) terminal of port 101, a negative voltage is generated at the negative terminal of port 102.

The magnitude of the voltage generated across port 102 is related to the duty-cycle of first switch means 110, and may be greater or smaller than the magnitude of the voltage at port 101, hence the term buck-boost. At a 50% duty cycle, the magnitudes are roughly equal. Below 50%, the output magnitude is less than the input magnitude. Above 50%, the output magnitude is greater than the input magnitude.

As in converter 200, capacitance 144 is coupled to node 104, filter capacitor 106 and load 3 are each coupled across port 102, and input source 2 is coupled to port 101. Control means 150 is not expressly shown in FIG. 13A in order to simplify the visual complexity of converter 540. However, control means 150 is coupled to each of the switch means as indicated above. Notations of the port couplings are shown in FIG. 13A, and are clearly sufficient to those of ordinary skill in the art as to how control means 150 is interconnected to switch means 110, 120, and 230.

As in converter 200, second inductor 140 and third switch means 230 are coupled in series, with the series combination coupled between node 104 and a source of energy 142, which is the output voltage across output port 102 for converter 540. Source 142 is provided by the output voltage across capacitor 106 by way of switch means 120, which is conducting during the OFF period and thereby couples node 104 to output port 102 during this time. To reduce or prevent the reverse-recovery current, third switch means 230 operates as before, being rendered conductive a short time duration before second switch means 120 is to be rendered non-conductive. Rectifier 234 is oriented to conduct current from the positive terminal of port 102 to node 104. Second inductor 140 and third switch means 230 operate to reverse the current flow through second switch means 120 by coupling current to node 104 in a time period ($t_0$–$t_1$) before second switch means 120 is to be rendered non-conductive. The current drawn by second inductor 140 is opposite to the current being drawn from node 104 by first inductor 105. The current provided by second inductor 140 ramps up with time and soon equals the current drawn by first inductor 105, leaving substantially no current conducted by second switch means 120. A short time later, after current in switch means 120 reverses, transistor 122 may be rendered non-conductive, as described above.

It may be appreciated that, as described above in FIG. 11, a rectifier may be used in place of second switch means 120 as the rectifying device. Additionally, other variations of second inductor 140, the third switch means (130, 230), and the energy source (142, 442) described above in FIGS. 4, and 8–10 may be applied in the buck-boost topology. As an example, a tenth embodiment of the present invention configured in a buck-boost topology and having the variation of converter 460 of FIG. 10 is shown at 560 in FIG. 13B. Converter 560 comprises the same elements as converter 460. Accordingly, the same reference numeral is used for corresponding elements. However, these elements are arranged differently. Each of ports 101 and 102 has a positive terminal and a negative terminal. The positive and negative terminals of port 102 of converter 560 are reversed from those of converter 460. First switch means 110 and second switch means 120 are coupled in series at node 104, as in converter 460. However, the series combination of switch means 110 and 120 in converter 560 is coupled between respective first terminals of ports 101 and 102 (e.g., positive terminal of port 101 and negative terminal of port 102), rather than across input port 101. First switch means 110 is coupled to input port 101 and second switch means 120 is coupled to port 102. (These arrangements are the same as those for converter 540 in FIG. 13A).

Instead of being coupled between output port 102 and node 104 as in converter 460, first winding 406 of converter 560 is coupled between node 104 and respective second terminals of ports 101 and 102 (e.g., negative terminal of port 101 and positive terminal of port 102). As such, winding 406 of transformer 405 (the first magnetic storage means) is coupled in series with switch means 120 (the rectifying device) at node 104, and the series combination is coupled in parallel with output port 102. Switch means 110 and 120 operate as before in an alternating, non-overlapping manner. When switch means 110 is closed, current and energy are built up in first winding 406 and magnetic storage means 405, respectively (ON period). Node 104 is coupled to the positive terminal of port 101 and second switch means 120 is open with no current flowing to port 102 from winding 406. When first switch means 110 is opened and second switch means 120 closed (OFF-period), the built-up current in first winding 406 is directed to port 102 in a direction opposite to that in converter 460. Because of this and because the positive terminal of port 102 is connected to the negative (ground) terminal of port 101, a negative voltage is generated at the negative terminal of port 102. The magnitude of the voltage generated across port 102 is related to the duty-cycle of first switch means 110 as described above for converter 540 shown in FIG. 13A.

As with converter 460, capacitance 144 is coupled to node 104, filter capacitor 106 and load 3 are each coupled across port 102, and input source 2 is coupled to port 101. Switch control means 150 is not expressly shown in FIG. 13B in order to simplify the visual complexity of converter 560. However, switch means 150 is coupled to each of the switch means as indicated above. Notations of the port couplings are shown in FIG. 13B and are clearly sufficient to those of ordinary skill in the art as to how switch control means 150 is interconnected to switch means 110, 120, and 230.

As in converter 460, second inductor 140, third switch means 230, and second winding 407 are coupled in a series loop, with transistor 232 oriented such that its source terminal is coupled to ground. This provides the advantage of referencing the gate-to-source voltage of transistor 232 to ground, and thereby enabling a more simple control circuitry (i.e., one without an isolation transformer) to be used. To reduce or prevent the reverse-recovery current, third switch means 230 operates as before, being rendered conductive a short time duration before second switch means 120 is to be rendered non-conductive. As in converter 460, rectifier 234 is oriented such that current may flow out of the "dotted" terminal of second winding 407. When transistor 232 is closed, the voltage across second winding 407 is applied across second inductor 140, and the reversing current is generated. The reversing current is transformed over to first winding 406 by transformer action, where it causes a current to flow from the positive (second) terminal of output port 102 to node 104. This reverses the current flow through second switch means 120 by coupling current to node 104 in a time period ($t_0$-$t_1$) before second switch means 120 is to be rendered non-conductive.

As is known in the converter art, the buck-boost and flyback converter topologies are related, with the flyback topology being an isolated version of the buck-boost converter. An eleventh embodiment of the present invention configured in a flyback topology is shown at 600 in FIG. 14A. With the exception of intermediate node 104 and capacitance 144, which have been eliminated, converter 600 comprises the same elements as (buck-boost) converter 540 shown in FIG. 13A. Accordingly, the same reference numeral is used for corresponding elements. In place of node 104 and capacitance 144, converter 600 comprises two intermediate nodes 104A and 104B and two capacitances 144A and 144B. Converter 600 further comprises an isolation power transformer 605 having a primary winding 606 and a secondary winding 607. First switch means 110 is coupled in series with primary winding 606 at intermediate node 104B, and this series combination is coupled across input port 101. In a similar manner, second switch means 120 (the rectifying device) is coupled in series with secondary winding 607 at intermediate node 104A, and this series combination is coupled across output port 102. Capacitance 144A is coupled to node 104A and capacitance 144B is coupled to node 104B.

In converter 540, first switch means 110 and second switch means 120 are coupled in series at node 104, with the series combination being coupled between respective terminals of ports 101 and 102. An analogous configuration occurs in converter 600 with isolation transformer 605 providing the coupling between the switch means. Specifically, switching means 110 and 120 are coupled together by transformer 605 at nodes 104A and 104B, and this compound series circuit is coupled between ports 101 and 102. As one viewpoint, node 104 has been split into two nodes 104A and 104B. Capacitance 144B represents the parasitic capacitance of switch means 110 and primary winding 606, and capacitance 144A represent the parasitic capacitance of switch means 120 and secondary winding 607. Additional capacitance may be added to either of capacitances 144A and 144B to control EMI. (As is known in the circuit arts, one of capacitances 144A and 144B may be transformed over to the other side of transformer 605 and combined with the other for analysis purposes.)

In converter 600, each of ports 101 and 102 has a positive terminal and a negative terminal. The positive and negative terminals of output port 102 of converter 600 are reversed from those of converter 540. Because transformer 605 isolates the primary and secondary circuits, the polarity of the voltage generated at port 102 may be designed to be either positive or negative, depending upon the orientation of secondary winding 607 to output port 102. As can be seen from the above description, switch means 110 and 120 are arranged differently in converter 600 than their arrangement in converter 540. The difference is not essential nor necessary, but rather is for locating transistors 112 and 122 such that their source terminals are coupled to the grounds of ports 101 and 102.

Switch means 110 and 120 operate as before in an alternating, non-overlapping manner. When switch means 110 is closed, current and energy are built up in primary winding 606 and transformer 605, respectively (ON period). At this time, second switch means 120 is open with no current flowing to port 102 from secondary winding 607. When first switch means 110 is opened and second switch means 120 closed, the built-up energy in transformer 605 is discharged as current in secondary winding 607 to port 102 (OFF period). During this time, substantially no current flows in primary winding 406 and the voltage across the transformer windings reverses, or "flies back", hence the terminology flyback. For a one-to-one turns ratio on windings 606 and 607, the magnitude of output voltage at port 102 is related to the input voltage and duty cycle of first switch means 110 in substantially the same way as in converter 540 described above.

As in converter 540, filter capacitor 106 and load 3 are each coupled across port 102 and input source 2 is coupled to port 101. Control means 150 is not expressly shown in FIG. 14A in order to simplify the visual complexity of converter 600. However, control means 150 is coupled to each of the switch means as indicated above. Notations of the port couplings are shown in FIG. 14A, and are clearly sufficient to those of ordinary skill in the art as to how control means 150 is interconnected to switch means 110, 120, and 230.

Similarly to converters 540 and 200, second inductor 140 and third switch means 230 are coupled in series, with the series combination coupled between node 104A and a source of energy 142, which is the output voltage across output port 102 for converter 600. To reduce or prevent the reverse-recovery current, third switch means 230 operates as before, being rendered conductive a short time duration before second switch means 120 is to be rendered non-conductive. Rectifier 234 is oriented to conduct current from the positive terminal of port 102 to node 104A during the OFF-period. Second inductor 140 and third switch means 230 operate to reverse the current flow through second switch means 120 by coupling current to node 104A in a time period $(t_0-t_1)$ before second switch means 120 is to be rendered non-conductive. When conducting current during the flyback phase, second switch means 120 is also coupling current to node 104A. Also during the flyback phase, current is drawn from node 104A by secondary winding 607 in a predetermined manner (i.e., at declining rate because its voltage is substantially fixed). The current provided by second inductor 140 ramps up with time and displaces the current provided by switch means 120. The current through inductor 140 soon equals the current drawn by secondary winding 607, and leaves substantially no current conducted by second switch means 120. A short time later, after current in switch means 120 reverses, transistor 122 may be rendered non-conductive, as described above.

It may be appreciated that, as described above in FIG. 11, a rectifier may be used in place of second switch means 120 as the rectifying device. Additionally, other variations of second inductor 140, the third switch means (130, 230), and the energy source (142, 442) described above in FIGS. 4, and 8–10 may be applied in the flyback topology. As an example, a twelfth embodiment of the present invention configured in a flyback topology and having the variation of converter 460 of FIG. 10 is shown at 620 in FIG. 14B. With the exception of source 142, converter 620 comprises the same elements as converter 600. Accordingly, the same reference numeral is used for corresponding elements. In place of source 142, converter 620 comprises primary winding 607 as a source 442 of energy for second inductor 140. With the exception of second inductor 140 and third switch means 230, the elements of converter 620 are arranged the same as the corresponding elements of converter 600. The series circuit of third switch means 230 and second inductor 140 is coupled in parallel with primary winding 606, and the reversing current built up in second inductor 140 is coupled to node 104A by transformer action from primary winding 606 to secondary winding 607. Transformer 605 and primary winding 606 serve as an energy source 442 for second inductor 140. Rectifier 234 is, as in converters 460 and 560, oriented to allow current to flow out of the "dotted" terminal of primary winding 606.

Switch means 110 and 120 operate as before in an alternating, non-overlapping manner. Third switch means 230 also operates as before, being rendered conductive a short time duration before second switch means 120 is to be rendered non-conductive. Switch control means 150 is not expressly shown in FIG. 14B in order to simplify the visual complexity of converter 620. However, switch means 150 is coupled to each of the switch means as indicated above. Notations of the port couplings are shown in FIG. 14B and are clearly sufficient to those of ordinary skill in the art as to how switch control means 150 is interconnected to switch means 110, 120, and 230.

Second inductor 140, third switch means 230, and winding 606 form a series loop, with transistor 232 oriented such that its source terminal is coupled to the input voltage. When transistor 232 is closed, the voltage across primary winding 606 is applied across second inductor 140, and the reversing current is generated. The reversing current is transformed over to secondary winding 607 by transformer action, where it causes a current to flow from output port 102 to node 104A. This reverses the current flow through second switch means 120 by coupling current to node 104A in a time period $(t_0-t_1)$ before second switch means 120 is to be rendered non-conductive.

A thirteenth embodiment of the present invention configured in a uk topology is shown at 650 in FIG. 15. With the exception of intermediate node 104 and capacitance 144, converter 600 comprises the same elements as converter 200 shown in FIG. 6. Accordingly, the same reference numeral is used for corresponding elements. However, these components are arranged in a different manner. In place of node 104 and capacitance 144, converter 650 comprises two intermediate nodes 104A and 104B and two capacitances 144A and 144B. Converter 650 further comprises a third inductor 660, and an isolation capacitor 665 coupled between nodes 104A and 104B. First switch means 110 is coupled in series with third inductor 660 at intermediate node 104B, and this series combination is coupled across input port 101. In a similar manner, second switch means 120 is coupled in series with first inductor 105 at intermediate node 104A, and this series combination is coupled across output port 102. Capacitance 144A is coupled to node 104A and capacitance 144B is coupled to node 104B. Capacitance 144B comprises the parasitic capacitance of switch means 110, and capacitance 144A comprises the parasitic capacitance of switch means 120.

Switch means 110 and 120 operate as before in an alternating, non-overlapping manner. In the preferred operation of converter 650, a continuous current flows in each of inductors 660 and 105, in the directions indicated in FIG. 15, and a positive voltage is generated across capacitor 665 in the reference direction indicated in FIG. 15. For the purposes of discussion and without loss of generality, the capacitance of capacitor 665 is sufficiently large that the voltage across capacitor 665 does not substantially change over the duration of a switching cycle of switch means 110 and 120. As such, capacitor 665 enables the voltages at nodes 104A and 104B to be offset by a relatively constant voltage value, and enables voltage changes to be coupled from node 104B to node 104A. Also for the purposes of discussion and without loss of generality, the operation of converter 650 is discussed with the assumptions of steady input voltage, steady output current, a steady switching period T, and a fixed ON-period of $T_{ON}$ and fixed OFF-period of $T_{OFF}$ for first switch means 110 ($T_{ON}+T_{OFF}=T$).

As explained in greater detail below, energy is transferred from input port 101 to output port 102 in a three-step process. Energy is first stored in inductor 660 from port 101 during a first ON-period. Next, this energy is transferred to capacitor 665 during the following OFF-period. Finally, the energy is transferred from capacitor 665 to inductor 105 and port 102 during the subsequent (second) ON-period. Before describing the flow of currents and energy in greater detail, the average voltages at nodes 104A and 104B during the ON and OFF periods, and the average voltages across capacitor 65 and port 102 are described.

With the above steady-state assumptions, the voltage at node 104B, $V_{104B}$, is substantially equal to zero during the ON-period because switch means 110 grounds node 104B. The average value of $V_{104B}$ during the OFF-period is substantially equal to $V_{IN}*T/T_{OFF}$, where $V_{IN}$ is the potential of source 2. This average value is determined with the steady-state constraint that the volt-seconds product applied to third inductor 660 is substantially zero during each switching cycle T. Because the value of T is greater than the value of $T_{OFF}$, the average value of $V_{104B}$ during the OFF-period is greater than $V_{IN}$.

From this, the average voltage value across capacitor 665 may be determined. During the OFF-period, the voltage at node 104A, $V_{104A}$, is substantially zero due to the conduction of second switch means 120. Thus, the average value across capacitor 665 during the OFF-period is substantially equal to the average value of $V_{104B}$ during the OFF period, which is $V_{IN}*T/T_{OFF}$. As indicated above, the capacitance of capacitor 665 is sufficiently large that the voltage across capacitor 665 does not substantially change over a switching cycle. Thus the average voltage across capacitor 665 during the ON-period is substantially equal to $V_{IN}*T/T_{OFF}$. As explained below, current flows into capacitor 665 during the OFF period, raising the capacitor's voltage $V_{665}$ by a small amount, and flows out of capacitor 665 during the ON period, lowering voltage $V_{665}$ by a small amount. As a reasonable approximation, $V_{665}$ begins the OFF period at a value of $(V_{IN}*T/T_{OFF}-\Delta V/2)$ and ends at a value of $(V_{IN}*T/T_{OFF}+\Delta V/2)$, where $\Delta V$ is the small voltage change. During the ON period, voltage $V_{665}$ ramps back down to $(V_{IN}*T/T_{OFF}-\Delta V/2)$.

From the average voltage value of capacitor $V_{665}$, the value of voltage $V_{104A}$ during the ON-period may be determined. With node 104B grounded and second switch means 120 open during the ON-period, the voltage across capacitor 665 brings voltage $V_{104A}$ down to $-V_{665}$, giving $V_{104A}$ an average value of $-V_{IN}*T/T_{OFF}$ during the ON-period. Consequently, the average voltage $V_{104A}$ at node 104A alternates between $-V_{IN}*T/T_{OFF}$ during the ON-period and zero during the OFF-period.

From the voltage at node 104A, the output voltage may be determined. With continuous current flowing through first inductor 105, the output voltage $V_{OUT}$ adjusts to a value which sets the volt-seconds product for inductor 105 to substantially zero for each switching cycle (assuming steady-state operation). With the above voltage levels for node 104A, the average output voltage is therefore $-V_{IN}*T_{ON}/T_{OFF}$, as referenced to ground. The magnitude of this value is less than the voltage magnitude of $V_{104A}$ during the ON-period ($|-V_{IN}*T/T_{OFF}|$) since T is greater than $T_{ON}$.

With this general explanation of the voltages in converter 650, the currents through inductor 105, inductor 660, capacitor 665, and switch means 110 and 120 are discussed. During the ON-period, switch means 110 is closed and second switch means 120 is open. The current though inductor 105 flows into capacitor 665 since second switch means 120 is OFF (the voltage at node 104A at this time is negative and therefore does not cause rectifier 121 to conduct). From capacitor 665, this current flows in switch means 110, along with the current flowing through inductor 660. The current through each of inductors 660 and 105 increases substantially linearly during the ON-period due to the positive voltage applied across each. The current flowing through capacitor 665 causes each of the voltage across capacitor 665 and the charge stored therein to decrease nearly linearly. This charge is replaced during the subsequent OFF-period. The energy lost by capacitor 665 during the ON period is coupled to second inductor 105, which increases its stored energy during the ON period. The closing of switch means 110 thereby causes the energy stored by capacitor 665 to be coupled to inductor 105 (the first magnetic storage means) at node 104A.

During the OFF-period, switch means 110 is open and second switch means 120 is closed. The current though inductor 660 now flows into capacitor 665 since first switch means 110 is open (the voltage at node 104B at this time is positive and therefore does not cause rectifier 111 to conduct). From capacitor 665, this current flows into switch means 120, along with the current flowing through inductor 105. The current through each of inductors 660 and 105 now decreases substantially linearly during the OFF-period due to the negative voltage applied across each. The current flowing through capacitor 665 causes each of the voltage across capacitor 665 and the charge stored therein to increase. Accordingly, it may be appreciated that capacitor 665 comprises an energy storage and voltage translation means which generates a potential difference between nodes 104B and 104A and enables current to flow between these nodes. Additionally, capacitor 665 selectively couples energy to inductor 105 (the first magnetic energy storage means) in response to switch means 110 conducting.

Thus, energy is transferred from input port 101 to inductor 105 in a three-step process. As a first step, energy is stored in inductor 660 from port 101 during the ON-period. As the second step, this energy is transferred to capacitor 665 during the next OFF-period. As the third step, this energy is transferred from capacitor 665 to inductor 105 during the subsequent ON-period. If both switch means 110 and 120 conduct at the same time, which for example may occur if a reverse-recovery current occurs in rectifier 121, a portion of the energy stored by capacitor 665 will be dissipated and wasted.

Similar to converter 200, second inductor 140 and third switch means 230 are coupled in series, with the series combination coupled between node 104A and a source of energy 142, which is the output voltage across capacitor 106 and output port 102. Source 142 is provided by way of switch means 120, which is conducting during the OFF period and thereby couples node 104 to output port 102 during this time. Third switch means 230 is operated as before, being rendered conductive a short time duration before second switch means 120 is to be rendered non-conductive. In contrast to converter 200, rectifier 234 is oriented to conduct current from node 104A to the negative terminal of port 102. Second inductor 140 and third switch means 230 operate to reverse the current flow through second switch means 120 by coupling current from node 104A to the negative terminal of port 102 in a time period ($t_0$–$t_1$) during the OFF-period just before second switch means 120 is to be rendered non-conductive. During this time, the currents from both inductors 660 and 105 are flowing into node 104A and into second switch means 120. The current drawn from node 104A by second inductor 140 ramps up with time and draws these inductor currents away from switch means 120. The current through inductor 140 soon equals these inductor currents, and leaves substantially no current conducted by second switch means 120. A short time later, after current in switch means 120 reverses, transistor 122 may be rendered non-conductive, as described above.

Switch control means 150 is not expressly shown in FIG. 15 in order to simplify the visual complexity of converter 650. However, switch means 150 is coupled to each of the switch means as indicated above. Notations of the port couplings are shown in FIG. 15 and are clearly sufficient to those of ordinary skill in the art as to how switch control means 150 is interconnected to switch means 110, 120, and 230. It may be also appreciated that, as described above in FIG. 11, a rectifier may be used in place of second switch means 120 as the rectifying device. Additionally, other variations of second inductor 140, the third switch means (130, 230), and the energy source (142, 442) described above in FIGS. 4, and 8–10 may be applied in the uk topology.

It may be also appreciated that the present invention may also be applied to the transformer version of the uk converter. In this version, an isolation transformer is coupled between node 104B and isolation capacitor 665, with the primary winding coupled between node 104B and the ground terminal of port 101, and the secondary winding coupled between capacitor 665 and the ground terminal of port 102. An additional capacitor is coupled in series with the primary winding. The transformer version enables the voltages at output port 102 to be completely isolated from the voltages at input port 101.

A fourteenth embodiment of the present invention configured in the topology of the secondary circuit of a forward converter is shown at 700 in FIG. 16. With the exception of certain additional elements specified below, converter 700 comprises the same elements as converter 200 (buck converter topology) shown in FIG. 6. Accordingly, the same reference numeral is used for corresponding elements. In addition to these elements, converter 700 comprises a power transformer 710 having a primary winding 711 and secondary winding 712, and a second rectifying device 720. Primary winding 711 is coupled in series with first switch means 110, and the series combination is coupled to port 101. Secondary winding 712 is coupled in series with rectifying device 720, and this series combination is coupled between node 104 and the ground reference of the secondary circuit. Because the secondary circuit of a forward converter functions in a similar manner as a buck converter topology, the arrangement of elements in converter 700 is only slightly different from the arrangement of elements in converter 200. In comparing converters 700 and 200, it may be seen that the sub-circuit formed by switch means 110, transformer 710, and rectifying device 720 of converter 700 has taken the place of first switch means 110 of converter 200.

Switch means 110 and 120 operate as before in an alternating, non-overlapping manner. When switch means 110 is closed, energy and voltage are coupled to secondary winding 712 from primary winding 711. Current and energy flow through rectifying device 720 to node 104 and first inductor 105. When first switch means 110 is opened and second switch means 120 is closed, positive voltage is removed from second winding 712 and the current built up in first inductor 105 now completes its path through second switch means 120. Converter 700 is generally designed and operated such that a continuous current flows through inductor 105 throughout the switching cycle of switch means 110. When second switch means 120 is subsequently opened and first switch means 110 is next caused to close, rectifier 121 is capable of conducting a reverse recovery current, which would short secondary winding 712 and waste energy.

To reduce or prevent the reverse-recovery current, third switch means 230 operates as before, being rendered conductive a short time duration before second switch means 120 is to be rendered non-conductive. Switch control means 150 is not expressly shown in FIG. 16 in order to simplify the visual complexity of converter 700. However, switch means 150 is coupled to each of switch means 110, 120, and 230 as indicated above. Notations of the port couplings are shown in FIG. 16 and are clearly sufficient to those of ordinary skill in the art as to how switch control means 150 is interconnected to switch means 110, 120, and 230. It may also be appreciated that, as described above in FIG. 11, a rectifier may be used in place of second switch means 120 as the (first) rectifying device. Additionally, other variations of second inductor 140, the third switch means (130, 230), and the energy source (142, 442) described above in FIGS. 4, and 8–10 may be applied in the secondary circuit of a forward converter.

While the present invention has been particularly described with respect to the illustrated embodiment, it will be appreciated that various alterations, modifications and adaptations may be made based on the present disclosure, and are intended to be within the scope of the present invention. While the invention has been described in connection with what is presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. In an electrical power converter having an input port for receiving a first energy source, an output port, a first magnetic storage means, means for periodically coupling energy present at the input port to the first magnetic storage means in a plurality of consecutive cycles, each cycle comprising an ON period wherein energy is coupled to the first magnetic storage means from the input port and an OFF period wherein energy is not substantially coupled to the first magnetic storage means from the input port, and a rectifying device coupled to the first magnetic storage means for enabling the energy stored in the first magnetic storage means during each said ON period to be coupled to the output port during the subsequent OFF period, said rectifying device substantially blocking current flow during each ON period, a reversal circuit for reversing the direction of current flow in the rectifying device during a time interval just prior to the end of each OFF period, comprising:

a second energy source;

a second magnetic storage means;

a reversal switch means for coupling said second magnetic storage means to said second energy source during each OFF period, said reversal switch means closing in a time interval prior to the end of said OFF period such that a reversing current is caused to be generated in said second magnetic storage means; and means for coupling said reversing current to the rectifying device, said reversing current reversing the direction of current flow in the rectifying device such that the conduction of current by the rectifying device is substantially reduced at the end of said OFF period.

2. The circuit of claim 1 wherein said means for periodically coupling energy present at the input port to the first magnetic storage means in a plurality of consecutive cycles comprises a first switch means coupled between the input port and said first magnetic storage means, wherein said rectifying device comprises a second switch means, and wherein said reversal switch means comprises a third switch means.

3. The circuit of claim 1 wherein said means for periodically coupling energy present at the input port to the first magnetic storage means in a plurality of consecutive cycles comprises a first switch means coupled between the input port and said first magnetic storage means, wherein said rectifying device comprises a rectifier, and wherein said reversal switch means comprises a second switch means.

4. The circuit of claim 1 wherein for each OFF period said reversal switch means opens after the direction of current flow in said rectifying device is reversed and before the beginning of the subsequent OFF period.

5. The circuit of claim 1 wherein said reversal switch means comprises a switching transistor device coupled in series with a rectifier.

6. The circuit of claim 1 wherein the rectifying device is coupled to the first magnetic storage means at a first intermediate node, wherein said second magnetic storage means comprises a winding coupled in series with said reversal switch means to form a series combination thereof, said series combination being coupled between said first intermediate node and said second energy source, and wherein said means for coupling said reversing current to said rectifying device comprises the electrical coupling of said series combination to said intermediate node.

7. The circuit of claim 6 wherein said second magnetic storage means comprises an inductor.

8. The circuit of claim 6 wherein said second energy source comprises the voltage generated at the output port.

9. The circuit of claim 6 wherein the first magnetic storage means comprises a first winding coupled in series with said rectifying device at said first intermediate node, a second winding magnetically coupled to said first winding such that energy may be transferred between said first and second windings; and wherein said Second energy source comprises said second winding of said first magnetic storage means coupled in series with the series combination of said reversal switch means and the winding of said second magnetic storage means.

10. The circuit of claim 9 wherein said second energy source further comprises the voltage generated at the output port, the series circuit formed by the winding of said second magnetic storage means, said reversal switch means, and the second winding of said first magnetic storage means being coupled between said first intermediate node and said output port.

11. The circuit of claim 1 wherein said rectifying device comprises a rectifier having an anode and a cathode and oriented such that current and energy may be coupled from the first magnetic storage means to the output port during the OFF periods.

12. The circuit of claim 11 wherein said rectifier is rendered substantially non-conducting at the end of each OFF period.

13. The circuit of claim 1 wherein the output port is for providing converted energy to a load.

14. The circuit of claim 1 wherein the first magnetic storage means comprises a first winding coupled in series with said rectifying device at a first intermediate node, the series combination of said first winding and said rectifying device being coupled in parallel with said output port.

15. In an electrical power converter having an input port for receiving a first energy source, an output port, a first magnetic storage means, means for periodically coupling energy present at the input port to the first magnetic storage means in a plurality of consecutive cycles, each cycle Comprising an ON period wherein energy is coupled to the first magnetic storage means from the input port and an OFF period wherein energy is not substantially coupled to the first magnetic storage means from the input port, and a rectifying device coupled to the first magnetic storage means for enabling the energy stored in the first magnetic storage means during each said ON period to be coupled to the output port during the subsequent OFF period, said rectifying device substantially blocking current flow during each ON period, a reversal circuit for reversing the direction of current flow in the rectifying device during a time interval just prior to the end of each OFF period, comprising:

a second energy source;

a second magnetic storage means;

a reversal switch means for Coupling said second magnetic storage means to said second energy source during each OFF period, said reversal switch means closing in a time interval prior to the end of said OFF period such that a reversing current is caused to be generated in said second magnetic storage means; and means for coupling said reversing current to the rectifying device, said reversing current reversing the direction of current flow in the rectifying device such that the conduction of current by the rectifying device is substantially reduced at the end of said OFF period; and wherein the first magnetic storage means comprises a first winding coupled in series with said rectifying device at a first intermediate node, and a second winding magnetically coupled to said first winding such that energy may be transferred between said first and second windings;

wherein said second magnetic storage means comprises a winding coupled in series with said reversal switch means;

wherein said second energy source comprises the energy generated at said second winding of said first magnetic storage means, said second winding of said first magnetic storage means being coupled in series with said winding of said second magnetic storage means and said reversal switch means; and wherein said means for coupling said reversing current to said rectifying device comprises the transformer action between said first and second windings of said first magnetic storage means.

16. The circuit of claim 15 wherein said second energy source further comprises the voltage generated at the output port, the series circuit of the second winding of said first magnetic storage means, the winding of said second magnetic storage means, and said reversal switch means being coupled to said output port.

17. The circuit of claim 15 wherein said series circuit is coupled to itself to form a series circuit loop.

18. In an electrical power converter having an input port for receiving a first energy source, an output port, a first magnetic storage means, means for periodically coupling energy present at the input port to the first magnetic storage means in a plurality of consecutive cycles, each cycle comprising an ON period wherein energy is coupled to the first magnetic storage means from the input port and an OFF period wherein energy is not substantially coupled to the first magnetic storage means from the input port, and a rectifying device coupled to the first magnetic storage means for enabling the energy stored in the first magnetic storage means during each said ON period to be coupled to the output port during the subsequent OFF period, said rectifying device substantially blocking current flow during each ON period, a reversal circuit for reversing the direction of current flow in the rectifying device during a time interval just prior to the end of each OFF period, comprising:

a second energy source;

a second magnetic storage means;

a reversal switch means for coupling said second magnetic storage means to said second energy source during each OFF period, said reversal switch means closing in a time interval prior to the end of said OFF period such that a reversing current is caused to be generated in said second magnetic storage means; and means for coupling said reversing current to the rectifying device, said reversing current reversing the direction of current flow in the rectifying device such that the conduction of current by the rectifying device is substantially reduced at the end of said OFF period; and wherein tile first magnetic storage means comprises a transformer having a first winding coupled in series with said rectifying device at a first intermediate node, and a second winding magnetically coupled to said first winding such that energy may be transferred between said first and second windings, said second winding including a leakage inductance;

wherein said energy source comprises the energy generated at said second winding of said first magnetic storage means, said second winding being coupled in series with said reversal switch means;

wherein said second magnetic storage means comprises the leakage inductance of said second winding; and wherein said means for coupling said reversing current to said rectifying device comprises the transformer action between said first and second windings of said first magnetic storage means.

19. In an electrical power converter having an input port for receiving a first energy source, an output port, a first magnetic Storage means, means for periodically coupling energy present at the input port to the first magnetic storage means in a plurality of consecutive cycles, each cycle comprising an ON period wherein energy is coupled to the first magnetic storage means from the input port and an OFF period wherein energy is not substantially coupled to the first magnetic storage means from the input port, and a rectifying device coupled to the first magnetic storage means for enabling the energy stored in the first magnetic storage means during each said ON period to be coupled to the output port during the subsequent OFF period, said rectifying device substantially blocking current flow during each ON period, a reversal circuit for reversing the direction of current flow in the rectifying device during a time interval just prior to the end of each OFF period, comprising:

a second energy source;

a second magnetic storage means;

a reversal switch means for coupling said second magnetic storage means to said second energy source during each OFF period, said reversal switch means closing in a time interval prior to the end of said OFF period such that a reversing current is caused to be generated in said second magnetic storage means; and means for coupling said reversing current to the rectifying device, said reversing current reversing the direction of current flow in the rectifying device such that the conduction of current by the rectifying device is substantially reduced at the end of said OFF period; and wherein said rectifying device comprises a second switch means having a switching transistor device and a rectifier, said transistor device having a control terminal, a first conduction terminal coupled said first magnetic storage means and a second conduction terminal coupled to the output port, said rectifier having an anode and a cathode and being coupled between said conduction terminals of said transistor device, said rectifier being oriented such that current and energy may be coupled from the first magnetic storage means to the output port during the OFF periods.

20. The circuit of claim 19 further comprising a switch control means coupled to the control terminal of said switching transistor device of said second switch means for causing said transistor device to become conductive substantially at the beginning of each OFF period and to become non-conductive substantially at the end of each OFF period, said switch control means further for causing said reversal switch means to close a predetermined time before the transistor device of said second switch means is rendered non-conductive.

21. The circuit of claim 19 wherein said rectifier of said second switch means is rendered substantially non-conducting at the end of each OFF period.

22. In an electrical power converter having an input port for receiving a first energy source, an output port, a first magnetic storage means, means for periodically coupling energy present at the input port to the first magnetic storage means in a plurality of consecutive cycles, each cycle comprising an ON period wherein energy is coupled to the first magnetic storage means from the input port and an OFF period wherein energy is not substantially coupled to the first magnetic storage means from the input port, and a rectifying device coupled to the first magnetic storage means for enabling the energy stored in the first magnetic storage means during each said ON period to be coupled to the output port during the subsequent OFF period, said rectifying device substantially blocking current flow during each ON period, a reversal circuit for reversing the direction of current flow in the rectifying device during a time interval just prior to the end of each OFF period, comprising:

a second energy source;

a second magnetic storage means;

a reversal switch means for coupling said second magnetic storage means to said second energy source during each OFF period, said reversal switch means closing in a time interval prior to the end of said OFF period such that a reversing current is caused to be generated in said second magnetic storage means; and means for coupling said reversing current to the rectifying device, said reversing current reversing the direction of current flow in the rectifying device such that the conduction of current by the rectifying device is substantially reduced at the end of said OFF period; and wherein each of the input and output ports includes first and second terminals, wherein the first magnetic storage means comprises a first winding coupled in series with said rectifying device at a first intermediate node, the series combination of the first winding and said rectifying device being coupled between respective first terminals of the input and output ports, and wherein the converter's means for periodically coupling energy present at the input port to the first magnetic storage means comprises a first switch means coupled between the input port and said first intermediate node, the first switch means being caused to close at the beginning of each ON period and being caused to open at the end of each ON period, the first switch means when closed coupling energy present at the input port to the first winding of the first magnetic storage means.

23. In an electrical power converter having an input port for receiving a first energy source, an output port, a first magnetic storage means, means for periodically coupling energy present at the input port to the first magnetic storage means in a plurality of consecutive cycles, each cycle comprising an ON period wherein energy is coupled to the first magnetic storage means from the input port and an OFF period wherein energy is not substantially coupled to the first magnetic storage means from the input port, and a rectifying device coupled to the first magnetic storage means for enabling the energy stored in the first magnetic storage means during each said ON period to be coupled to the output port during the subsequent OFF period, said rectifying device substantially blocking current flow during each ON period, a reversal circuit for reversing the direction of current flow in the rectifying device during a time interval just prior to the end of each OFF period, comprising:

a second energy source:

a second magnetic storage means;

a reversal switch means for coupling said second magnetic storage means to said second energy source during each OFF period, said reversal Switch means closing in a time interval prior to the end of said OFF period such that a reversing current is caused to be generated in said second magnetic storage means; and means for coupling said reversing current to the rectifying device, said reversing current reversing the direction of current flow in the rectifying device such that the conduction of current by the rectifying device is substantially reduced at the end of said OFF period; and wherein the first magnetic storage means comprises a first winding coupled in series with said rectifying device at a first intermediate node, the series combination of said first winding and said rectifying device being coupled in parallel with said output port, and wherein the converter's means for periodically coupling energy present at the input port to the first magnetic storage means comprises a first switch means coupled between the input port and said first intermediate node, the first switch means being caused to close at the beginning of each ON period and being caused to open at the end of each ON period, the first switch means when closed coupling energy present at the input port to the first winding of the first magnetic storage means.

24. In an electrical power converter having an input port for receiving a first energy source, an output port, a first magnetic storage means, means for periodically coupling energy present at the input port to the first magnetic storage means in a plurality of consecutive cycles, each cycle comprising an ON period wherein energy is coupled to the first magnetic storage means from the input port and an OFF period wherein energy is not substantially coupled to the first magnetic storage means from the input port, and a rectifying device Coupled to the first magnetic storage means for enabling the energy stored in the first magnetic storage means during each said ON period to be coupled to the output port during the subsequent OFF period, said rectifying device substantially blocking current flow during each ON period, a reversal circuit for reversing the direction of current flow in the rectifying device during a time interval just prior to the end of each OFF period, comprising:

a second energy source;

a second magnetic storage means;

a reversal switch means for coupling said second magnetic storage means to said second energy source during each OFF period, said reversal switch means closing in a time interval prior to the end of said OFF period such that a reversing current is caused to be generated in said second magnetic storage means; and means for coupling said reversing current to the rectifying device, said reversing current reversing the direction of current flow in the rectifying device such that the conduction of current by the rectifying device is substantially reduced at the end of said OFF period; and wherein the first magnetic storage means comprises a first winding coupled in series with said rectifying device at a first intermediate node, the series combination of said first winding and said rectifying device being coupled in parallel with said output port, wherein the converter's first magnetic storage means further includes a second winding magnetically coupled to said first winding and forming a transformer therewith such that energy may be stored in magnetic form and transferred between said first and second windings, and wherein the converter's means for periodically coupling energy present at the input port to the first magnetic storage means comprises a first switch means coupled in series with said second winding, the series combination being coupled between the terminals of the input port, the first switch means being caused to close at the beginning of each ON period and being caused to open at the end of each ON period, the first switch means when closed coupling energy present at the input port to the transformer formed by the first and second windings.

25. In an electrical power converter having an input port for receiving a first energy source, an output port, a first magnetic storage means, means for periodically coupling energy present at the input port to the first magnetic storage means in a plurality of consecutive cycles, each cycle comprising an ON period wherein energy is coupled to the first magnetic storage means from the input port and an OFF period wherein energy is not substantially coupled to the first magnetic storage means from the input port, and a rectifying device coupled to the first magnetic storage means for enabling the energy stored in the first magnetic storage means during each said ON period to be coupled to the output port during the subsequent OFF period, said rectifying device substantially blocking current flow during each ON period, a reversal circuit for reversing the direction of current flow in the rectifying device during a time interval just prior to the end of each OFF period, comprising:

a second energy source;
a second magnetic storage means;
a reversal switch means for coupling said second magnetic storage means to said second energy source during each OFF period, said reversal switch means closing in a time interval prior to the end of said OFF period such that a reversing current is caused to be generated in said second magnetic storage means; and
means for coupling said reversing current to the rectifying device, said reversing current reversing the direction of current flow in the rectifying device such that the conduction of current by the rectifying device is substantially reduced at the end of said OFF period; and
wherein the first magnetic storage means comprises a first winding coupled in series with said rectifying device at a first intermediate node, the series combination of said first winding and said rectifying device being coupled in parallel with said output port, and wherein the converter's means for periodically coupling energy present at the input port to the first magnetic storage means comprises:
a second intermediate node;
an energy storage and voltage translation means coupled between said first and second intermediate nodes for generating a potential difference between said first and second intermediate nodes, for enabling current to flow between said intermediate nodes, and for selectively coupling energy to said first magnetic storage means at said first intermediate node;
an inductor and a first switch means coupled in series at said second intermediate node, the series combination being coupled in parallel with said input port, the first switch means being caused to close at the beginning of each ON period and being caused to open at the end of each ON period, the first switch means when closed coupling energy present at the input port to the inductor and causing the energy storage and translation means to couple energy stored therein to said first magnetic storage means, the first switch means when opened causing the inductor to couple energy stored therein to the energy storage and translation means.

26. The circuit of claim 25 wherein the energy storage and voltage translation means comprises a capacitor coupled between said first and second intermediate nodes.

27. In an electrical power converter having an input port for receiving a first energy source, an output port, a first magnetic storage means, means for periodically coupling energy present at the input port to the first magnetic storage means in a plurality of consecutive cycles, each cycle comprising an ON period wherein energy is coupled to the first magnetic storage means from the input port and an OFF period wherein energy is not substantially coupled to the first magnetic storage means from the input port, and a rectifying device coupled to the first magnetic storage means for enabling the energy stored in the first magnetic storage means during each said ON period to be coupled to the output port during the subsequent OFF period, said rectifying device substantially blocking current flow during each ON period, a reversal circuit for reversing the direction of current flow in the rectifying device during a time interval just prior to the end of each OFF period, comprising:

a second energy source;
a second magnetic storage means;
a reversal switch means for coupling said second magnetic storage means to said second energy source during each OFF period, said reversal switch means closing in a time interval prior to the end of said OFF period such that a reversing current is caused to be generated in said second magnetic storage means; and
means for coupling said reversing current to the rectifying device, said reversing current reversing the direction of current flow in the rectifying device such that the conduction of current by the rectifying device is substantially reduced at the end of said OFF period; and
wherein the first magnetic storage means comprises a first winding coupled in series with said rectifying device at a first intermediate node, the series combination of said first winding and said rectifying device being coupled in parallel with said output port, and wherein the converter's means for periodically coupling energy present at the input port to the first magnetic storage means comprises:
a transformer having a primary winding and a secondary winding;
a first switch means coupled in series with the primary winding, said series combination being coupled between the converter's input port, the first switch means being caused to close at the beginning of each ON period and being caused to open at the end of each ON period, the first switch means when closed coupling energy present at the input port to the secondary winding by way of the primary winding; and a second rectifying device coupled in series with the secondary winding, said series combination being coupled to the first intermediate node, said second rectifying device for enabling energy from the secondary winding to be coupled to the first intermediate node during each ON period.

* * * * *